(12) United States Patent
Chen et al.

(10) Patent No.: US 12,287,667 B2
(45) Date of Patent: Apr. 29, 2025

(54) CONTROL SYSTEM, CLOCK SYNCHRONIZATION METHOD, CONTROLLER, NODE DEVICE, AND VEHICLE

(71) Applicant: HUAWEI TECHNOLOGIES CO., LTD., Guangdong (CN)

(72) Inventors: Xuefeng Chen, Shenzhen (CN); Tao Qin, Shenzhen (CN); Jie Li, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 90 days.

(21) Appl. No.: 18/306,557

(22) Filed: Apr. 25, 2023

(65) Prior Publication Data

US 2023/0266788 A1 Aug. 24, 2023

Related U.S. Application Data

(63) Continuation of application No. PCT/CN2020/124943, filed on Oct. 29, 2020.

(51) Int. Cl.
*G06F 1/12* (2006.01)
*G06F 1/08* (2006.01)
(Continued)

(52) U.S. Cl.
CPC .................. *G06F 1/12* (2013.01); *G06F 1/08* (2013.01); *G06F 1/10* (2013.01); *G06F 13/404* (2013.01);
(Continued)

(58) Field of Classification Search
CPC ..... G06F 1/08; G06F 1/10; G06F 1/12; G06F 1/14; G06F 13/405; G06F 15/17375; H04L 7/0008; H04L 12/422
See application file for complete search history.

(56) References Cited

U.S. PATENT DOCUMENTS 6,230,194 B1 * 5/2001 Frailong ................. H04L 41/28
709/221
7,280,550 B1 * 10/2007 Rosenboom .......... H04L 7/0008
370/452
(Continued)

FOREIGN PATENT DOCUMENTS

| CN | 102332973 A | 1/2012 |
|----|-------------|--------|
| CN | 104112363 A | 10/2014 |

(Continued)

OTHER PUBLICATIONS

"The Free On-Line Dictionary of Computing". Entry 'ACK'. Online Jul. 1, 1997. Retrieved from Internet Sep. 16, 2024. < http://foldoc.org/ack>. (Year: 1997).*
(Continued)

*Primary Examiner* — Thomas J. Cleary
(74) *Attorney, Agent, or Firm* — Fish & Richardson P.C.

(57) ABSTRACT

The present disclosure relates to control systems, clock synchronization methods, controllers, node devices, and vehicles. In one example control system provided in this application, a primary controller directly sends a reference clock signal to at least one node device by using a ring network, so that the at least one node device can perform timing based on a frequency of the reference clock signal.

20 Claims, 19 Drawing Sheets

(51) Int. Cl.
  *G06F 1/10* (2006.01)
  *G06F 13/40* (2006.01)
  *G06F 15/173* (2006.01)
  *H04L 7/00* (2006.01)
  *H04L 12/42* (2006.01)

(52) U.S. Cl.
  CPC ...... *G06F 15/17375* (2013.01); *H04L 7/0008* (2013.01); *H04L 12/422* (2013.01)

(56) References Cited

U.S. PATENT DOCUMENTS

| | | | | |
|---|---|---|---|---|
| 11,451,410 | B2* | 9/2022 | Jerolm | H04J 3/0664 |
| 2002/0131454 | A1 | 9/2002 | Franke et al. | |
| 2002/0152373 | A1* | 10/2002 | Sun | H04L 63/0428 |
| | | | | 713/150 |
| 2004/0196872 | A1* | 10/2004 | Nakamura | H04J 3/0652 |
| | | | | 370/512 |
| 2005/0120252 | A1* | 6/2005 | Uwatoko | G06F 9/30083 |
| | | | | 712/E9.032 |
| 2006/0221856 | A1* | 10/2006 | Quiroz | H04W 84/20 |
| | | | | 370/254 |
| 2008/0140891 | A1* | 6/2008 | Fong | G06F 13/368 |
| | | | | 710/110 |
| 2008/0144668 | A1 | 6/2008 | Hall et al. | |
| 2008/0147280 | A1* | 6/2008 | Breed | B60R 21/20 |
| | | | | 702/173 |
| 2011/0202700 | A1* | 8/2011 | Inoue | G06F 13/385 |
| | | | | 710/305 |
| 2012/0324095 | A1* | 12/2012 | Barzel | G06F 9/5088 |
| | | | | 709/224 |
| 2013/0108271 | A1 | 5/2013 | Tang et al. | |
| 2013/0131839 | A1* | 5/2013 | Washington | G05B 15/02 |
| | | | | 700/19 |
| 2013/0279525 | A1 | 10/2013 | Zheng et al. | |
| 2014/0185450 | A1 | 7/2014 | Luo et al. | |
| 2018/0091320 | A1* | 3/2018 | Fujiwara | H04L 12/10 |
| 2018/0145849 | A1* | 5/2018 | Tam | G06F 1/10 |
| 2019/0339733 | A1* | 11/2019 | Lee | G06F 1/324 |
| 2021/0184664 | A1* | 6/2021 | Weyer | H03L 7/183 |

FOREIGN PATENT DOCUMENTS

| | | | | |
|---|---|---|---|---|
| CN | 107196724 | A | 9/2017 | |
| CN | 110546922 | A | 12/2019 | |
| CN | 110654398 | A | 1/2020 | |
| CN | 110865962 | A | 3/2020 | |
| CN | 111082888 | A | 4/2020 | |
| JP | 2002077196 | A | 3/2002 | |
| JP | 2002517035 | A | 6/2002 | |
| JP | 2006191372 | A | 7/2006 | |
| JP | 2008011223 | A | 1/2008 | |
| JP | 2008502182 | A | 1/2008 | |
| JP | 2008118680 | A | 5/2008 | |
| JP | 2009157512 | A | 7/2009 | |
| JP | 2010027062 | A | 2/2010 | |
| JP | 2012099994 | A | 5/2012 | |
| JP | 2013061700 | A | 4/2013 | |
| JP | 2019047216 | A | 3/2019 | |
| JP | 2020508625 | A | * 3/2020 | H04L 7/04 |

OTHER PUBLICATIONS

IEEE SA, "IEEE 802.1AS-2020; IEEE Standard for Local and Metropolitan Area Networks—Timing and Synchronization for Time-Sensitive Applications" Jan. 30, 2020, retrieved from URL: <https://standards.ieee.org/ieee/802.1AS/7121/>, 23 pages.

IEEE SA, "IEEE 1588-2002; IEEE Standard for a Precision Clock Synchronization Protocol for Networked Measurement and Control Systems," Sep. 12, 2002, retrieved from URL: <https://standards.ieee.org/ieee/1588/3140/>, 9 pages.

IEEE SA, "IEEE 802.3-2018; IEEE Standard for Ethernet," Jun. 14, 2018, retrieved from URL :<https://standards.ieee.org/ieee/802.3/7071/>, 13 pages.

International Search Report and Written Opinion in International Appln. No. PCT/CN2020/124943, mailed on Jul. 27, 2021, 14 pages (with English translation).

Office Action in Japanese Appln. No. 2023-526155, mailed on Jun. 25, 2024, 10 pages (with English translation).

Extended European Search Report in European Appln No. 20959148.6, dated Nov. 10, 2023, 11 pages.

* cited by examiner

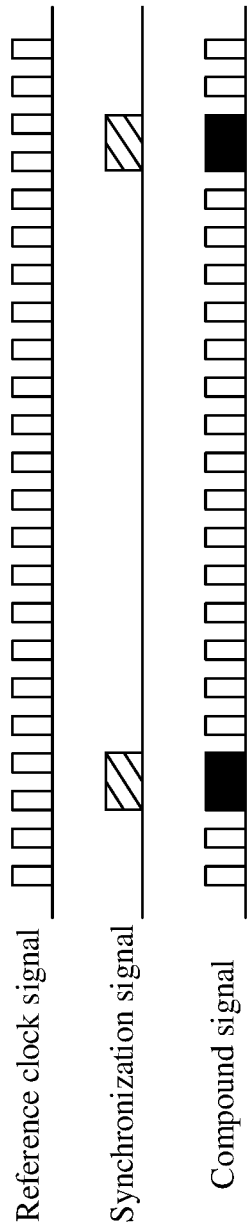
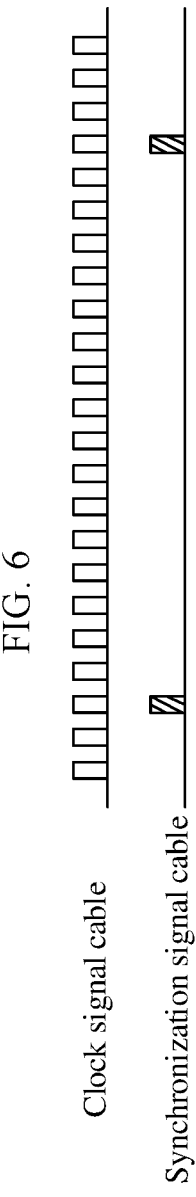
FIG. 6
FIG. 7

CONTROL SYSTEM, CLOCK SYNCHRONIZATION METHOD, CONTROLLER, NODE DEVICE, AND VEHICLE

CROSS-REFERENCE TO RELATED APPLICATIONS

This application is a continuation of International Application No. PCT/CN2020/124943, filed on Oct. 29, 2020, the disclosure of which is hereby incorporated by reference in its entirety.

TECHNICAL FIELD

This application relates to the field of electronic technologies in the automotive field, and in particular, to a control system, a clock synchronization method, a controller, a node device, and a vehicle.

BACKGROUND

With the development of vehicle intelligence, a quantity of electronic control units (ECUs) included in a vehicle control system is increasing. The ECU may be connected to a sensor and an executor. The ECU can process data collected by the sensor, and control the executor to perform a corresponding operation.

To implement precise control of the vehicle, clock synchronization among a plurality of ECUs needs to be ensured. In a related technology, a precision time protocol (PTP) or an Ethernet control automation technology (EtherCAT) is used to implement the clock synchronization among a plurality of ECUs.

However, when the PTP or EtherCAT is used for clock synchronization, a primary ECU in the plurality of ECUs may transmit a data frame to other ECUs, and receive data frames returned by other ECUs. The primary ECU may determine a clock error between local clocks of the plurality of ECUs based on the data frames returned by other ECUs, and then perform clock synchronization on the local clocks of the ECUs. In this synchronization manner, synchronization precision is low.

SUMMARY

This application provides a control system, a clock synchronization method, a controller, a node device, and a vehicle, to resolve a problem of low synchronization precision in clock synchronization among a plurality of control devices that are in a control system and that are configured to control a sensor and an executor.

According to an aspect, this application provides a control system. The control system includes a ring network. The ring network includes a primary controller and at least one node device. The primary controller is configured to perform timing based on a frequency of a local clock signal of the primary controller and execute a task, and is configured to send a reference clock signal to the at least one node device by using the ring network. The reference clock signal is obtained based on the local clock signal of the primary controller. The at least one node device is configured to perform timing based on a frequency of the reference clock signal and execute a task.

In the solution provided in this application, the primary controller directly sends the reference clock signal to perform time synchronization, so that precision of clock synchronization between the primary controller and the node device can be improved to precision equal to a pulse width of the reference clock signal. This effectively improves precision of clock synchronization. In addition, because the primary controller and the at least one node device in the control system can be sequentially connected to form a ring network, it can be ensured that there are redundant signal exchange paths during signal exchange between the primary controller and the at least one node device, thereby ensuring reliability of signal transmission.

Optionally, the reference clock signal may be the local clock signal of the primary controller, that is, the primary controller may directly send the local clock signal of the primary controller to the at least one node device.

Optionally, the reference clock signal may be a clock signal obtained by performing frequency division on the local clock signal of the primary controller. Because the frequency of the local clock signal of the primary controller is generally high, the primary controller may perform frequency division on the local clock signal of the primary controller to obtain the reference clock signal, to ensure that the node device can support the frequency of the reference clock signal.

Optionally, the at least one node device may include a phase-locked loop. The at least one node device may be configured to: correct a frequency of a local clock signal of the node device based on the frequency of the reference clock signal by using the phase-locked loop, to maintain a target ratio between the frequency of the local clock signal of the node device and the frequency of the reference clock signal; and perform timing based on the frequency of the local clock signal of the node device.

The target ratio may be a fixed value preset in the node device, and the target ratio is a ratio of two positive integers. The node device corrects the frequency of the local clock signal of the node device by using the phase-locked loop, so that the frequency of the local clock signal of the node device and the frequency of the reference clock signal can achieve pulse-level synchronization.

Optionally, the at least one node device may be configured to perform timing based on the frequency of the reference clock signal. In other words, the node device can directly execute a task based on a beat of the reference clock signal, and does not need to correct the frequency of the local clock signal of the node device.

Optionally, the primary controller may be further configured to adjust the frequency of the local clock signal of the primary controller within a target frequency range, that is, the primary controller may perform frequency modulation on the local clock signal of the primary controller, to implement frequency modulation on the reference clock signal.

Performing frequency modulation on the reference clock signal can effectively improve electromagnetic compatibility (EMC) performance of a frequency sensitive circuit in the control system in a task execution process.

Optionally, the primary controller may be further configured to send a synchronization signal to the at least one node device by using the ring network. The at least one node device is further configured to correct time of a local clock of the node device based on the received synchronization signal. In this way, not only frequency synchronization of clocks, but also time synchronization, can be implemented between the primary controller and the at least one node device.

Optionally, the primary controller may be connected to the at least one node device by using a clock signal cable.

The primary controller is configured to send the synchronization signal and the reference clock signal to the at least one node device by using the clock signal cable. The at least one node device is configured to separately obtain the synchronization signal and the reference clock signal from a received signal based on an amplitude and/or a pulse width of the received signal.

The primary controller transmits the synchronization signal and the reference clock signal by using one clock signal cable. This can avoid an increase in a quantity of signal cables between the primary controller and the node device in the control system, and simplify a structure of the control system.

Optionally, the primary controller may be connected to the at least one node device by using a clock signal cable and a synchronization signal cable. The primary controller is configured to send the reference clock signal to the at least one node device by using the clock signal cable, and is configured to send the synchronization signal to the at least one node device by using the synchronization signal cable.

The primary controller separately transmits the synchronization signal and the reference clock signal by using different signal cables, so that the node device does not need to parse the synchronization signal and the reference clock signal from a compound signal. This reduces complexity of receiving the synchronization signal and the reference clock signal by the node device.

Optionally, the at least one node device may be at least one secondary controller. The control system may further include at least one sensor and at least one executor. The at least one sensor is connected to the primary controller or the at least one secondary controller, and the at least one executor is connected to the primary controller or the at least one secondary controller. A task that needs to be executed by the primary controller and a task that needs to be executed by the at least one secondary controller each include one or more of the following tasks: a data transmission task, a data processing task, a sending task of an instruction, and an output task of a drive signal. The instruction is used to instruct the at least one sensor to collect data, or is used to instruct to output the drive signal to the at least one executor.

In the solution provided in this application, the primary controller may cooperate with the at least one secondary controller, to control the at least one sensor and the at least one executor in the control system.

Optionally, the primary controller may be further configured to: determine the task that needs to be executed by the primary controller and an execution moment of the task, determine the task that needs to be executed by the at least one secondary controller and an execution moment of the task, execute a task at the execution moment of the task that needs to be executed by the primary controller, and send a task scheduling table to the at least one secondary controller. The task scheduling table received by the at least one secondary controller includes the task that needs to be executed by the at least one secondary controller and the execution moment of the task. Correspondingly, the at least one secondary controller may be configured to execute, based on the task scheduling table, the task at the execution moment of the task that needs to be executed by the at least one secondary controller.

Because the primary controller can schedule tasks in a unified manner, the primary controller and the at least one secondary controller can execute tasks in an orderly and efficient manner, to avoid a problem such as resource preemption or contention that occurs when a plurality of tasks are simultaneously executed.

Optionally, the primary controller may be further configured to: divide a general data processing task into a plurality of data processing tasks, and determine, based on load of the primary controller and load of the at least one secondary controller, a data processing task that needs to be executed by the primary controller and a data processing task that needs to be executed by the at least one secondary controller. In this way, a plurality of controllers included in the ring network can implement distributed execution of data processing tasks, and further improve, on the basis of improvement of task execution efficiency, utilization of computing resources of the controller.

Optionally, the at least one secondary controller may further store a priority list, and the priority list includes a priority of the at least one secondary controller. The at least one secondary controller may be further configured to: if it is determined that the primary controller is faulty or any signal cable connected to the primary controller is faulty, determine a new primary controller from the at least one secondary controller based on the priority list. Then, the new primary controller may perform unified scheduling management on a plurality of controllers in the control system, to be specific, a primary control right of the control system may be handed over to the new primary controller, to ensure that the control system can still normally run.

Optionally, the primary controller and the at least one secondary controller may be further configured to: send target data to another controller in the control system by using the ring network, and if the target data transmitted by using the ring network is not received, or received target data transmitted by using the ring network is inconsistent with the sent target data, perform fault detection on the ring network, and/or resend the target data.

The target data may be data that has a high requirement on security and needs to be shared by the plurality of controllers in the ring network. By using the foregoing method, it can be ensured that the target data can be reliably transmitted to a receiver.

Optionally, the control system may further include at least one first router. A first port of the at least one first router is connected to the primary controller or the at least one secondary controller, and a second port of the at least one first router is connected to the at least one sensor and/or the at least one executor. A data transmission rate of the first port is lower than a data transmission rate of the ring network, and a data transmission rate of the second port is lower than the data transmission rate of the first port. A controller connected to the at least one first router may be further configured to: perform frequency division on a frequency of the reference clock signal, and send a frequency-divided reference clock signal to the at least one first router. The at least one first router may be configured to perform timing based on the frequency of the received reference clock signal and execute a task. The task executed by the first router may include at least: exchanging, through the first port, data with the controller connected to the first router, and exchanging, through the second port, data with the at least one sensor and/or the at least one executor connected to the first router.

In the solution provided in this application, a sensor and/or an executor that have/has a high requirement on a data transmission rate may be directly connected to a controller (which may be the primary controller or the secondary controller) in the control system, and the controller sends an instruction at a higher frequency of the reference clock signal, and transmits data at a higher data transmission rate. A sensor and/or an executor that have/has a general requirement on a data transmission rate may be connected to the first router, and the first router sends an instruction at a medium frequency of the reference clock signal, and transmits data at a medium data transmission rate. In this way, the control system can be compatible with different types of sensors and executors. This effectively improves application flexibility of the control system.

Optionally, the control system may further include at least one second router. A third port of the at least one second router is connected to the second port of the at least one first router, and a fourth port of the at least one second router is connected to the at least one sensor and/or the at least one executor. A data transmission rate of the third port is equal to the data transmission rate of the second port, and a data transmission rate of the fourth port is lower than the data transmission rate of the third port. The at least one first router may be further configured to: perform frequency division on the frequency of the received reference clock signal, and send a frequency-divided reference clock signal to the at least one second router. The at least one second router is configured to perform timing based on the frequency of the received reference clock signal and execute a task. The task executed by the at least one second router includes at least: exchanging data with the at least one first router through the third port, and exchanging, through the fourth port, data with the at least one sensor and/or at least one executor connected to the at least one second router.

According to the control system provided in this application, the first router and the second router may be used to gradually reduce a data transmission rate and a frequency of the reference clock signal level by level, so that the controller, the first router, and the second router can execute an instruction based on different frequencies of the reference clock signal. In this way, application flexibility and compatibility of the control system are effectively improved. In addition, a plurality of routers of different levels are disposed. This can ensure smooth transition of the data transmission rate and the frequency of the reference clock signal, and further ensure stability of data transmission.

Optionally, the at least one node device may be at least one first router. The control system may further include: at least one sensor and at least one executor. The at least one sensor is connected to the primary controller or the at least one first router, and the at least one executor is connected to the primary controller or the at least one first router. A task that needs to be executed by the primary controller includes one or more of the following tasks: a data transmission task, a data processing task, a sending task of an instruction, and an output task of a drive signal. A task that needs to be executed by the at least one first router includes one or more of the following tasks: a data transmission task, a sending task of an instruction, and an output task of a drive signal. The instruction is used to instruct the at least one sensor to collect data, or is used to instruct to output the drive signal to the at least one executor.

In the solution provided in this application, the ring network may include only one primary controller, and the primary controller may implement centralized control on the at least one first router, the at least one sensor, and the at least one executor in the control system.

Optionally, a first port of the at least one first router is connected to the primary controller, to be specific, the at least one first router accesses the ring network through the first port. The control system may further include at least one second router. A third port of the at least one second router is connected to a second port of the at least one first router, and a fourth port of the at least one second router is connected to the at least one sensor and/or the at least one executor. A data transmission rate of the first port is equal to a data transmission rate of the ring network, a data transmission rate of the second port is lower than the data transmission rate of the first port, a data transmission rate of the third port is equal to the data transmission rate of the second port, and a data transmission rate of the fourth port is lower than the data transmission rate of the third port. The at least one first router is further configured to: perform frequency division on a frequency of the received reference clock signal, and send a frequency-divided reference clock signal to the at least one second router. The at least one second router is configured to perform timing based on a frequency of the received reference clock signal and execute a task. The task executed by the at least one second router includes at least: exchanging data with the at least one first router through the third port, and exchanging, through the fourth port, data with the at least one sensor and/or the at least one executor connected to the at least one second router.

In a scenario in which the node device is the first router, the second router may be used to reduce the data transmission rate and the frequency of the reference clock signal, so that a device (including the primary controller and the at least one first router) and the second router in the ring network may execute an instruction at different frequencies of the reference clock signal. In this way, application flexibility and compatibility of the control system are effectively improved.

Optionally, the primary controller may include a primary control module and a secondary control module connected to the primary control module. The at least one node device may include a primary node module and a secondary node module connected to the primary node module. The ring network includes a first ring subnet and a second ring subnet. The first ring subnet includes the primary control module and the primary node module in the at least one node device, and the second ring subnet includes the secondary control module and the secondary node module in the at least one node device. The reference clock signal is obtained based on a local clock signal of the primary control module. The primary control module is configured to separately send the reference clock signal to the secondary control module and the primary node module in the at least one node device. The secondary control module is configured to send the reference clock signal to the secondary node module in the at least one node device. Alternatively, the primary node module in the at least one node device is configured to send the reference clock signal to the secondary node module connected to the primary node module.

In this application, functions of the secondary control module and the primary control module included in the primary controller may be the same. Therefore, the secondary control module may also be referred to as a redundant control module. Functions of the primary node module and the secondary node module included in the node device may also be the same. Therefore, the secondary node module may also be referred to as a redundant node module. The redundant control module and the redundant node module are disposed, to ensure reliability of the primary controller and the node device during operation, thereby improving reliability of the entire control system.

Optionally, the at least one sensor in the control system may include a first-type sensor and a second-type sensor, and a function safety integrity level (SIL) of the first-type sensor is higher than a function safety integrity level of the second-type sensor. The at least one executor in the control system may include a first-type executor and a second-type executor, and a function safety integrity level of the first-type executor is higher than a function safety integrity level of the second-type executor. The first-type sensor is separately connected to the primary control module and the secondary control module, or is separately connected to the primary node module and the secondary node module. The second-type sensor is connected to one of the primary control module, the secondary control module, the primary node module, and the secondary node module. The first-type executor is separately connected to the primary control module and the secondary control module, or is separately connected to the primary node module and the secondary node module. The second-type executor is connected to one of the primary control module, the secondary control module, the primary node module, and the secondary node module.

According to the solution provided in this application, a device with a higher function safety integrity level is connected to both control modules of the primary controller, or is connected to both node modules of the node device. This can ensure reliability of data collection and instruction execution, thereby improving security of the control system. However, for a device with a lower function safety integrity level, the device is connected to only one control module in the primary controller or node device. This can simplify an architecture of the control system and reduce system complexity.

Optionally, the control system may further include a first power supply and a second power supply. The first power supply is separately connected to the primary control module and the primary node module in the at least one node device, and the first power supply is configured to supply power to the primary control module and the primary node module in the at least one node device. The second power supply is separately connected to the secondary control module and the secondary node module in the at least one node device, and the second power supply is configured to supply power to the secondary control module and the secondary node module in the at least one node device.

The redundant second power supply is disposed to supply power to the secondary control module and the secondary node module. This can ensure that the two ring subnets in the control system can operate independently, and further ensure function safety and reliability of the control system.

Optionally, the primary controller may be further configured to: if it is detected that any task is not executed at an execution moment of the any task, perform a fault response operation. The fault response operation may include one or more of the following operations: restarting a device for executing the any task, where the device is the primary controller or the at least one node device, restarting a sensor and/or an executor connected to the device for executing the any task, and executing a security task configured in the primary controller.

When detecting that an error occurs at a task execution moment, the primary controller can perform a fault response operation in time, to effectively ensure security and reliability of the control system.

Optionally, the control system may further include a gateway. The gateway is connected to the primary controller or the at least one node device. The gateway is configured to: send, to an external device, data from a device connected to the gateway, and send, to the device connected to the gateway, data from the external device. The external device is a device independent of the control system.

In the control system provided in this application, the primary controller or the at least one node device may further communicate with the external device by using the gateway. This enriches functions of the control system and improves flexibility of the control system during operation.

Optionally, the gateway may include a primary communication module and a secondary communication module connected to the primary communication module. The two redundant communication modules are designed, to ensure function safety and reliability when the primary controller or the at least one node device exchanges data with the external device.

Optionally, the control system may be a vehicle control system.

In another aspect, a clock synchronization method is provided. The method may be applied to a primary controller in a control system. The control system includes a ring network, and the ring network includes the primary controller and at least one node device. The method includes: performing timing based on a frequency of a local clock signal of the primary controller and executing a task; and sending a reference clock signal to the at least one node device by using the ring network. The reference clock signal is obtained based on the local clock signal of the primary controller, and the reference clock signal is used by the at least one node device to perform timing based on a frequency of the reference clock signal and execute a task.

Optionally, the reference clock signal is the local clock signal of the primary controller. Alternatively, the reference clock signal is a clock signal obtained by performing frequency division on the local clock signal of the primary controller.

Optionally, the method further includes: adjusting the frequency of the local clock signal of the primary controller within a target frequency range.

Optionally, the method further includes: sending a synchronization signal to the at least one node device by using the ring network. The synchronization signal is used by the at least one node device to correct time of a local clock of the at least one node device.

Optionally, the primary controller is connected to the at least one node device by using a clock signal cable. A process of sending the reference clock signal and the synchronization signal to the at least one node device by using the ring network may include: sending the reference clock signal and the synchronization signal to the at least one node device by using the clock signal cable.

Optionally, the primary controller is connected to the at least one node device by using the clock signal cable and a synchronization signal cable. A process of sending the reference clock signal to the at least one node device by using the ring network may include: sending the reference clock signal to the at least one node device by using the clock signal cable. A process of sending the synchronization signal to the at least one node device by using the ring network may include: sending the synchronization signal to the at least one node device by using the synchronization signal cable.

Optionally, the at least one node device is at least one secondary controller. The control system further includes at least one sensor and at least one executor. The at least one sensor is connected to the primary controller or the at least one secondary controller, and the at least one executor is connected to the primary controller or the at least one secondary controller. A task that needs to be executed by the primary controller and a task that needs to be executed by the at least one secondary controller each include one or more of the following tasks: a data transmission task, a data processing task, a sending task of an instruction, and an output task of a drive signal. The instruction is used to instruct the at least one sensor to collect data, or is used to instruct to output the drive signal to the at least one executor.

Optionally, the method may further include: determining the task that needs to be executed by the primary controller and an execution moment of the task; determining the task that needs to be executed by the at least one secondary controller and an execution moment of the task; and sending a task scheduling table to the at least one secondary controller. The task scheduling table includes the task that needs to be executed by the at least one secondary controller and the execution moment of the task. Correspondingly, a process of performing timing based on the frequency of the local clock signal of the primary controller and executing a task may include: performing timing based on the frequency of the local clock signal of the primary controller, and executing the task at the execution moment of the task that needs to be executed by the primary controller.

Optionally, the method may further include: dividing a general data processing task into a plurality of data processing tasks, and determining, based on load of the primary controller and load of the at least one secondary controller, a data processing task that needs to be executed by the primary controller and a data processing task that needs to be executed by the at least one secondary controller.

Optionally, the method may further include: sending target data to the at least one secondary controller by using the ring network, and if the target data transmitted by using the ring network is not received, or received target data transmitted by using the ring network is inconsistent with sent target data, performing fault detection on the ring network, and/or resending the target data.

Optionally, the control system may further include at least one first router. A first port of the at least one first router is connected to the primary controller, and a second port of the at least one first router is connected to the at least one sensor and/or the at least one executor. A data transmission rate of the first port is lower than a data transmission rate of the ring network, and a data transmission rate of the second port is lower than the data transmission rate of the first port. The method may further include: performing frequency division on the frequency of the reference clock signal, and sending a frequency-divided reference clock signal to the at least one first router.

Optionally, the primary controller includes a primary control module and a secondary control module connected to the primary control module. The at least one node device includes a primary node module and a secondary node module connected to the primary node module. The ring network includes a first ring subnet and a second ring subnet. The first ring subnet includes the primary control module and the primary node module in the at least one node device, and the second ring subnet includes the secondary control module and the secondary node module in the at least one node device. The reference clock signal is obtained based on the local clock signal of the primary control module. The process of sending the reference clock signal to the at least one node device by using the ring network may include: The primary control module separately sends the reference clock signal to the secondary control module and the primary node module in the at least one node device. The reference clock signal is sent by the primary node module to the secondary node module. Alternatively, the sending a reference clock signal to the at least one node device by using the ring network further includes: The secondary control module sends the reference clock signal to the secondary node module in the at least one node device.

Optionally, the method may further include: if it is detected that any task is not executed at an execution moment of the any task, performing a fault response operation. The fault response operation includes one or more of the following operations: restarting a device for executing the any task, where the device is the primary controller or the at least one node device, restarting a sensor and/or an executor connected to the device for executing the any task, and executing a security task configured in the primary controller.

According to still another aspect, a clock synchronization method is provided. The method may be applied to a node device in a control system. The control system includes a ring network, and the ring network includes a primary controller and at least one node device. The method may include: receiving, by using the ring network, a reference clock signal sent by the primary controller, where the reference clock signal is obtained based on a local clock signal of the primary controller; and performing timing based on a frequency of the reference clock signal and executing a task.

Optionally, the node device may include a phase-locked loop. A process in which the node device performs timing based on the frequency of the reference clock signal may include: correcting a frequency of a local clock signal of the node device based on the frequency of the reference clock signal by using the phase-locked loop, to maintain a target ratio between the frequency of the local clock signal of the node device and the frequency of the reference clock signal; and performing timing based on the frequency of the local clock signal of the node device.

Optionally, a process in which the node device performs timing based on the frequency of the reference clock signal may include: performing timing based on the frequency of the reference clock signal.

Optionally, the method may further include: receiving, by using the ring network, a synchronization signal sent by the primary controller; and correcting time of a local clock of the node device based on the synchronization signal.

Optionally, the node device is connected to the primary controller by using a clock signal cable. A process of receiving, by using the ring network, the reference clock signal and the synchronization signal that are sent by the primary controller may include: receiving, by using the clock signal cable, a signal sent by the primary controller; and separately obtaining the synchronization signal and the reference clock signal from the received signal based on an amplitude and/or a pulse width of the received signal.

Optionally, the node device is connected to the primary controller by using a clock signal cable and a synchronization signal cable. A process of receiving, by using the ring network, the reference clock signal sent by the primary controller may include: receiving, by using the clock signal cable, the reference clock signal sent by the primary controller. A process of receiving, by using the ring network, the synchronization signal sent by the primary controller may include: receiving, by using the synchronization signal cable, the synchronization signal sent by the primary controller.

Optionally, the node device is a secondary controller. The control system further includes at least one sensor and at least one executor. The at least one sensor is connected to the primary controller or the secondary controller, and the at least one executor is connected to the primary controller or the secondary controller. A task that needs to be executed by the primary controller and a task that needs to be executed by the secondary controller each include one or more of the following tasks: a data transmission task, a data processing task, a sending task of an instruction, and an output task of a drive signal. The instruction is used to instruct the at least one sensor to collect data, or is used to instruct to output the drive signal to the at least one executor.

Optionally, the method may further include: receiving, by using the ring network, a task scheduling table sent by the primary controller. The task scheduling table includes the task that needs to be executed by the secondary controller and an execution moment of the task. A process of performing timing based on the frequency of the reference clock signal and executing a task may include: performing timing based on the frequency of the reference clock signal, and executing the task at the execution moment of the task that needs to be executed by the secondary controller.

Optionally, the secondary controller further stores a priority list. The priority list includes a priority of at least one secondary controller included in the control system. The method may further include: if it is determined that the primary controller is faulty or any signal cable connected to the primary controller is faulty, determining a new primary controller from the at least one secondary controller based on the priority list.

Optionally, the method may further include: sending target data to another controller in the control system by using the ring network, and if the target data transmitted by using the ring network is not received, or received target data transmitted by using the ring network is inconsistent with the sent target data, performing fault detection on the ring network, and/or resending the target data.

Optionally, the control system may further include at least one first router. A first port of the at least one first router is connected to the secondary controller, and a second port of the at least one first router is connected to the at least one sensor and/or the at least one executor. A data transmission rate of the first port is lower than a data transmission rate of the ring network, and a data transmission rate of the second port is lower than the data transmission rate of the first port. The method may further include: performing frequency division on the frequency of the reference clock signal, and sending a frequency-divided reference clock signal to the at least one first router.

Optionally, the node device is a first router. The control system further includes at least one sensor and at least one executor. The at least one sensor is connected to the primary controller or the first router, and the at least one executor is connected to the primary controller or the first router. A task that needs to be executed by the primary controller includes one or more of the following tasks: a data transmission task, a data processing task, a sending task of an instruction, and an output task of a drive signal. A task that needs to be executed by the first router includes one or more of the following tasks: a data transmission task, a sending task of an instruction, and an output task of a drive signal. The instruction is used to instruct the at least one sensor to collect data, or is used to instruct to output the drive signal to the at least one executor.

Optionally, a first port of the first router is connected to the primary controller. The control system further includes at least one second router. A third port of the at least one second router is connected to a second port of the first router, and a fourth port of the at least one second router is connected to the at least one sensor and/or the at least one executor. A data transmission rate of the first port is equal to a data transmission rate of the ring network, a data transmission rate of the second port is lower than the data transmission rate of the first port, a data transmission rate of the third port is equal to the data transmission rate of the second port, and a data transmission rate of the fourth port is lower than the data transmission rate of the third port. The method may further include: performing frequency division on the frequency of the received reference clock signal, and sending a frequency-divided reference clock signal to the at least one second router.

For beneficial effects of the clock synchronization method provided in the foregoing aspects, refer to effect descriptions of corresponding features in the control system. Details are not described again in this application.

According to still another aspect, a primary controller is provided. The primary controller may be applied to the control systems provided in the foregoing aspects. In addition, the primary controller may include a programmable logic circuit and/or program instructions, and the primary controller is configured to implement the methods that are provided in the foregoing aspects and that are applied to the primary controller.

According to still another aspect, a node device is provided. The node device may be applied to the control systems provided in the foregoing aspects. In addition, the node device may include a programmable logic circuit and/or program instructions, and the node device is configured to implement the methods that are provided in the foregoing aspects and that are applied to the node device.

According to still another aspect, a vehicle is provided. The vehicle includes the control systems provided in the foregoing aspects. The vehicle may be an electric vehicle. In addition, the vehicle may be an autonomous vehicle, a teleoperated driving vehicle, an airborne vehicle, or the like.

The technical solutions provided in this application include at least the following beneficial effects:

This application provides the control system, the clock synchronization method, the controller, the node device, and the vehicle. The primary controller in the control system may directly send the reference clock signal to the at least one node device by using the ring network, so that the at least one node device can perform timing based on the frequency of the reference clock signal. In this way, clock synchronization between the primary controller and the at least one node device is implemented. Compared with sending of a data frame, direct sending of the reference clock signal may improve precision of clock synchronization between the primary controller and the at least one node device to precision equal to a pulse width of the reference clock signal, thereby effectively improving precision of clock synchronization. In addition, because the primary controller and the at least one node device in the control system can be sequentially connected to form the ring network, it can be ensured that there are redundant signal exchange paths during signal exchange between the primary controller and the at least one node device, thereby ensuring reliability of signal transmission.

BRIEF DESCRIPTION OF DRAWINGS

FIG. 6 is a schematic diagram of still another reference clock signal, synchronization signal, and compound signal according to an embodiment of this application;

FIG. 7 is a schematic diagram of a reference clock signal and a synchronization signal according to an embodiment of this application;

DESCRIPTION OF EMBODIMENTS

To make objectives, technical solutions, and advantages of this application clearer, the following further describes implementations of this application in detail with reference to the accompanying drawings.

Figure 1:
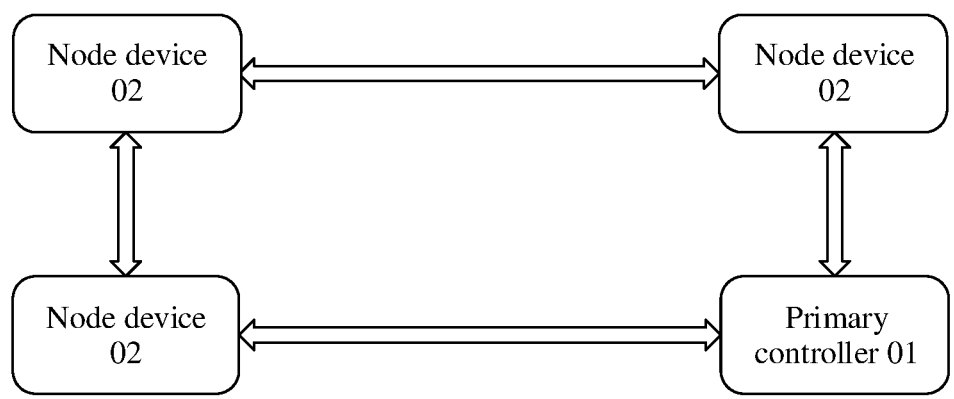
FIG. 1 is a schematic diagram of a structure of a control system according to an embodiment of this application.

An embodiment of this application provides a control system. As shown in FIG. 1, the control system includes a ring network, and the ring network includes a primary controller 01 (which may also be referred to as a central controller) and at least one node device 02. For example, FIG. 1 shows three node devices 02. The node device 02 may be a secondary controller, or may be a first router. Both the primary controller 01 and the secondary controller may be a control device including one or more processing chips. The first router may be a forwarding device including one or more forwarding chips.

The primary controller 01 is configured to: perform timing based on a frequency of a local clock signal of the primary controller 01 and execute a task, and send a reference clock signal to the at least one node device 02 by using the ring network. The reference clock signal is obtained based on the local clock signal of the primary controller 01.

The at least one node device 02 is configured to perform timing based on a frequency of the reference clock signal and execute a task. For example, the node device 02 may correct a frequency of a local clock signal of the node device 02 based on the frequency of the reference clock signal, and perform timing based on a corrected frequency of the local clock signal. Alternatively, the node device 02 may directly perform timing based on the frequency of the reference clock signal. In this way, clock synchronization between the primary controller 01 and the at least one node device 02 may be implemented.

Because the primary controller 01 and the at least one node device 02 can form a ring network, it can be ensured that there are redundant signal exchange paths during signal exchange between the primary controller 01 and the at least one node device 02. For example, it is assumed that a first interface of the primary controller 01 is connected to one node device 02, and a second interface of the primary controller 01 is connected to another node device 02. If a signal cable connected to the first interface of the primary controller 01 is faulty, the primary controller 01 may further transmit data to the ring network through the second interface of the primary controller 01, so that the data can be transmitted, by using the ring network, to the node device 02 connected to the first interface of the primary controller 01.

It should be understood that clock synchronization between the primary controller 01 and the node device 02 may mean that a ratio of frequencies of a clock signal referred to when the primary controller 01 and the node device 02 execute tasks is a target ratio. That is, the primary controller 01 and the node device 02 may execute tasks based on a beat of a fixed ratio. For example, if the target ratio is 1, it indicates that frequencies of a clock signal referred to when the primary controller 01 and the node device 02 execute tasks are the same. If the target ratio is n, n is a ratio of two positive integers, and n is not 1, it indicates that a frequency of a clock signal referred to when the primary controller 01 executes a task is n times a frequency of a clock signal referred to when the node device 02 executes a task.

It should be further understood that, as shown in FIG. 1, the primary controller 01 may be separately connected to two node devices 02. When sending a reference clock signal, the primary controller 01 may send the reference clock signal to only one node device 02 connected to the primary controller 01, and then the node device 02 sequentially sends the reference clock signal to other node devices 02. In other words, the reference clock signal in the ring network may be unidirectionally transmitted in a clockwise direction or a counterclockwise direction. Alternatively, the primary controller 01 may separately send a reference clock signal to two node devices 02 connected to the primary controller 01, and then the two node devices 02 forward the reference clock signal to another node device 02. In other words, the reference clock signal in the ring network may be bidirectionally transmitted in parallel in a clockwise direction and a counterclockwise direction.

In this embodiment of this application, in the ring network, not only the primary controller 01 and the node device 02, but also two adjacent node devices 02 may be connected by using a signal cable (which may also be referred to as a signal link). Therefore, the primary controller 01 may send the reference clock signal to the at least one node device 02 by using the signal cable. A manner in which the primary controller 01 transmits a reference clock signal to the at least one node device 02 by using a signal cable to implement clock synchronization may also be referred to as hardware synchronization.

Figure 2:
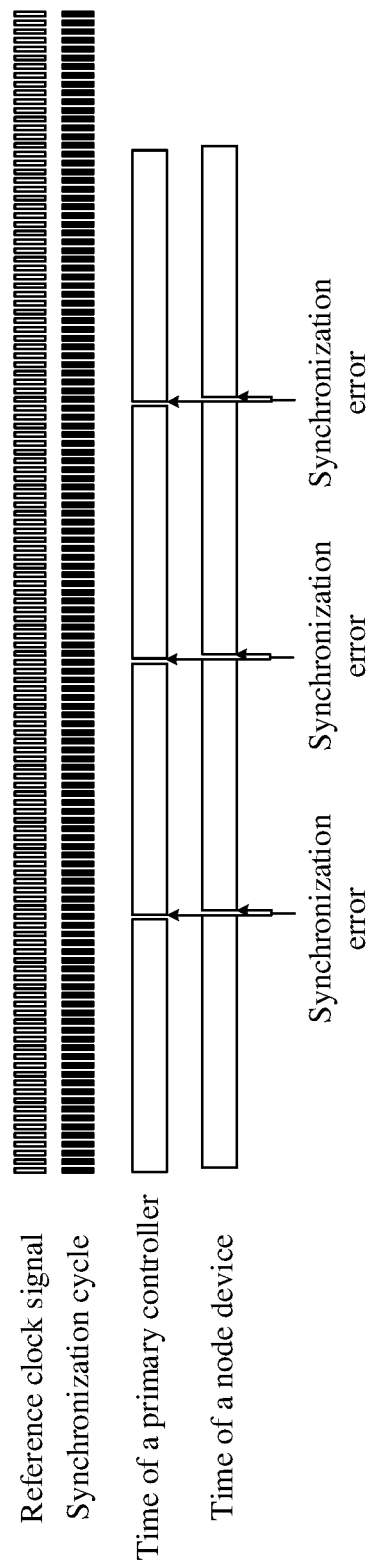
FIG. 2 is a schematic diagram of a synchronization error between a primary controller and a node device according to an embodiment of this application.

FIG. 2 is a schematic diagram of a synchronization error between a primary controller and a node device according to an embodiment of this application. As shown in FIG. 2, because the primary controller 01 may directly send a reference clock signal to the node device 02, it can be ensured that a synchronization cycle of clock synchronization performed between the primary controller 01 and the node device 02 is a cycle of the reference clock signal. Correspondingly, it can be ensured that an error (that is, a synchronization error) between time of the primary controller 01 and time of the node device 02 can be reduced to a level equal to a pulse width of the reference clock signal, in other words, pulse-level clock synchronization can be implemented. For example, it is assumed that a frequency of the reference clock signal is 1 gigahertz (GHz), that is, one clock cycle of the reference clock signal is 1 nanosecond (ns). In this case, the reference clock signal sent by the primary controller 01 every 1 ns may guide the node device 02 to correct a local clock of the node device 02, so that the synchronization error may be less than 1 ns. The ns-level synchronization error can meet requirements of most real-time control scenarios.

In conclusion, the embodiment of this application provides the control system. The primary controller in the control system may directly send the reference clock signal to the at least one node device by using the ring network, so that the at least one node device can perform timing based on the frequency of the reference clock signal. In this way, clock synchronization between the primary controller and the at least one node device is implemented. Compared with sending of a data frame, direct sending of the reference clock signal may improve precision of clock synchronization between the primary controller and the at least one node device to precision equal to a pulse width of the reference clock signal, thereby effectively improving precision of clock synchronization. In addition, because the primary controller and the at least one node device in the control system can be sequentially connected to form a ring network, it can be ensured that there are redundant signal exchange paths during signal exchange between the primary controller and the at least one node device, thereby ensuring reliability of signal transmission.

In addition, in the control system provided in this embodiment of this application, precision of time synchronization between the primary controller and the at least one node device is high. Therefore, it can be ensured that all time sensitive tasks can be moved up by an ECU to the primary controller or the node device for execution. This effectively reduces a quantity of ECUs in the control system, and simplifies a function of the ECU (for example, the ECU can be simplified as a router). The control system has lower complexity and higher flexibility.

Optionally, the reference clock signal may be a local clock signal of the primary controller 01, that is, the primary controller 01 may directly send the local clock signal of the primary controller 01 as the reference clock signal to the at least one node device 02.

Alternatively, the reference clock signal may be a clock signal obtained by performing frequency division on the local clock signal of the primary controller 01. That is, the primary controller 01 may first perform frequency division on the local clock signal of the primary controller 01 to obtain a reference clock signal, and then send the reference clock signal to the at least one node device 02.

Because a frequency of a source clock signal generated by a crystal oscillator in the primary controller 01 is generally within an intermediate frequency range, the local clock signal of the primary controller 01 may be generated after a phase-locked loop (PLL) in the primary controller 01 performs frequency multiplication on the source clock signal based on a preset frequency multiplication value. In addition, because a frequency of the local clock signal generated by the PLL in the primary controller 01 is generally high, the primary controller 01 may perform frequency division on the local clock signal of the primary controller 01 to obtain a reference clock signal, to ensure that the node device 02 can support a frequency of the reference clock signal.

In an optional implementation, the at least one node device 02 may include the PLL. The at least one node device 02 can correct a frequency of a local clock signal of the node device 02 based on the frequency of the reference clock signal by using the PLL, to maintain a target ratio between the frequency of the local clock signal of the node device 02 and the frequency of the reference clock signal. Then, the at least one node device 02 may perform timing based on a corrected frequency of the local clock signal of the at least one node device 02. The node device 02 corrects the frequency of the local clock signal of the node device 02 by using the phase-locked loop, so that the frequency of the local clock signal of the node device 02 and the frequency of the reference clock signal can achieve pulse-level synchronization.

The target ratio may be a fixed value preset in the node device 02, and the target ratio may be a ratio of two positive integers. For example, if the target ratio is 1, the node device 02 may trace and lock the frequency of the reference clock signal by using the PLL, so that the frequency of the local clock signal of the node device 02 is equal to the frequency of the reference clock signal.

In another optional implementation, the node device 02 may alternatively directly perform timing based on the frequency of the reference clock signal. In other words, the node device 02 can execute a task based on a beat of the reference clock signal, and does not need to correct the frequency of the local clock signal of the node device 02.

In this embodiment of this application, in a scenario in which the node device 02 is a secondary controller, the secondary controller may include a processor and at least one peripheral device connected to the processor. The at least one peripheral device may include an analog-to-digital converter (ADC), a timer, a pulse width modulation (PWM) circuit, a communication interface, and the like. The processor may be connected to the at least one peripheral device by using a peripheral bus, and can control the at least one peripheral device to execute a task. Correspondingly, in this implementation, the processor in the secondary controller can directly control, based on the frequency of the reference clock signal, the peripheral device to execute a task. In this way, peripheral bus task synchronization of the at least one secondary controller can be implemented. This synchronization manner may also be referred to as peripheral hardware synchronization (PHS).

Optionally, the primary controller 01 may be further configured to adjust the frequency of the local clock signal of the primary controller 01 within a target frequency range. In other words, the primary controller 01 may perform frequency modulation (FM), on the local clock signal of the primary controller 01. Correspondingly, the reference clock signal sent by the primary controller 01 to the at least one node device 02 is also a clock signal obtained after frequency modulation. The target frequency range may be a fixed frequency range prestored in the primary controller 01.

Frequency modulation is performed on the local clock signal of the primary controller 01, so that EMC performance of a circuit that is sensitive to a frequency in the control system (a frequency sensitive circuit for short) can be effectively improved in a task execution process. The frequency sensitive circuit may include a communication circuit, a drive circuit (which may also be referred to as a power output circuit), and the like. For example, it is assumed that the drive circuit is a PWM circuit. Because the PWM circuit outputs a PWM signal based on a frequency of the reference clock signal, after the primary controller 01 performs frequency modulation on the local clock signal of the primary controller 01, frequency modulation on the PWM signal is also performed. This effectively improves EMC performance of the PWM circuit.

Figure 3:
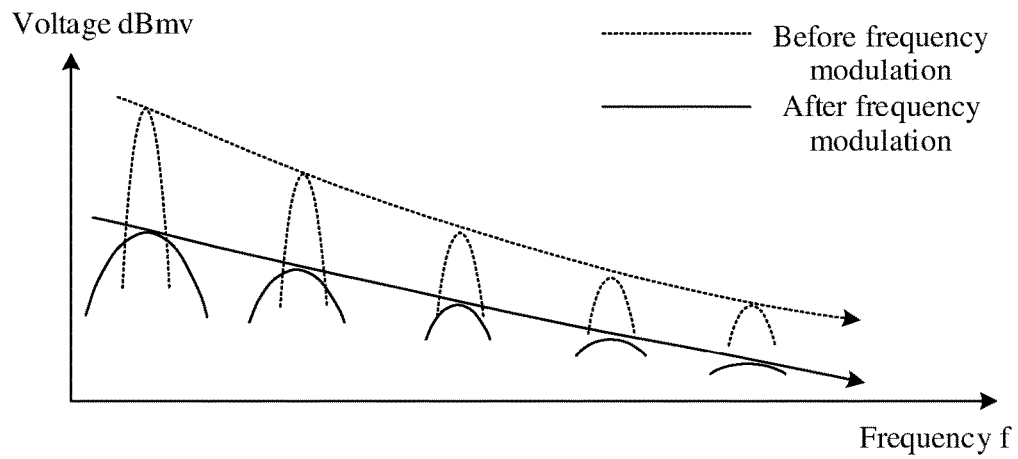
FIG. 3 is a schematic diagram in which an amplitude of a conduction signal or a radiation signal generated by a frequency sensitive circuit changes with a frequency according to an embodiment of this application.

FIG. 3 is a schematic diagram in which an amplitude of a conduction signal or a radiation signal generated by a frequency sensitive circuit changes with a frequency f according to an embodiment of this application. A unit of the amplitude is decibel millivolt (dBmv). Refer to FIG. 3. It can be learned that before the primary controller 01 performs frequency modulation on the local clock signal of the primary controller 01, an amplitude of the conduction signal or the radiation signal generated by the frequency sensitive circuit is high, and a spectrum is narrow. After performing frequency modulation on the local clock signal of the primary controller 01, the primary controller 01 can reduce the amplitude of the conduction signal or the radiation signal generated by the frequency sensitive circuit, and broaden the spectrum. This effectively improves EMC performance of the frequency sensitive circuit.

Optionally, the primary controller 01 may be further configured to send a synchronization signal to the at least one node device 02 by using the ring network. Correspondingly, the at least one node device 02 may be further configured to correct time of a local clock of the node device 02 based on the received synchronization signal. In other words, on the basis of the solution provided in this embodiment of this application, the primary controller 01 and the at least one node device 02 can implement not only clock frequency synchronization, but also time synchronization. A frequency of the synchronization signal may be far less than a frequency of the reference clock signal, and the frequency of the reference clock signal may be an integer multiple of the frequency of the synchronization signal. For example, the frequency of the reference clock signal may be 1 GHz, and the frequency of the synchronization signal may be 1 kilohertz (kHz).

For example, it is assumed that the frequency of the synchronization signal is 1 kHz, that is, the primary controller 01 sends a pulse of the synchronization signal every 1 ms. Each time after receiving the pulse of the synchronization signal, the node device 02 may correct the time of the local clock of the node device 02 to a value that is closest to current time and that is an integer multiple of ms. For example, it is assumed that when the node device 02 receives the pulse of the synchronization signal, the time of the local clock of the node device 02 is 100.001 ms, the node device 02 may correct the time of the local clock of the node device 02 to 100 ms.

In an optional implementation, the primary controller 01 in the ring network may be connected to the at least one node device 02 by using a clock signal cable. That is, not only the primary controller 01 and the node device 02, but also two adjacent node devices 02 are connected by using the clock signal cable. In this implementation, the primary controller 01 may be configured to send the synchronization signal and the reference clock signal to the at least one node device 02 by using the clock signal cable. In other words, the primary controller 01 may send a compound signal (which may also be referred to as a superposed signal) of the synchronization signal and the reference clock signal to the at least one node device 02 by using one clock signal cable.

Correspondingly, the at least one node device 02 may be configured to separately obtain the synchronization signal and the reference clock signal from the received signal based on an amplitude and/or a pulse width of the received signal.

Figure 4:
FIG. 4 is a schematic diagram of a reference clock signal, a synchronization signal, and a compound signal according to an embodiment of this application.
Figure 4:
Figure 4:

For example, refer to FIG. 4. A pulse width of the synchronization signal may be the same as a pulse width of the reference clock signal, and the primary controller 01 may add an amplitude of the reference clock signal and an amplitude of the synchronization signal to generate a compound signal. Correspondingly, in a process in which the at least one node device 02 receives the compound signal, if a pulse whose amplitude is greater than the amplitude of the reference clock signal is detected, it may be determined that a pulse of the synchronization signal is received.

Figure 5:
FIG. 5 is a schematic diagram of another reference clock signal, synchronization signal, and compound signal according to an embodiment of this application.
Figure 5:
Figure 5:

Alternatively, refer to FIG. 5. A pulse width of the synchronization signal may be the same as a pulse width of the reference clock signal, and the primary controller 01 may subtract an amplitude of the reference clock signal from an amplitude of the synchronization signal to generate a compound signal. Correspondingly, in a process in which the at least one node device 02 receives the compound signal, if a pulse whose amplitude is less than the amplitude of the reference clock signal is detected, or no pulse is detected within a clock cycle, it may be determined that the synchronization signal is received.

In other words, in a scenario in which the primary controller 01 generates a compound signal after adding or subtracting the amplitudes of the reference clock signal and the synchronization signal, the at least one node device 02 may separate the reference clock signal and the synchronization signal from the compound signal based on an amplitude of the compound signal.

Alternatively, refer to FIG. 6. A pulse width of the synchronization signal may be greater than a pulse width of the reference clock signal. For example, the pulse width of the synchronization signal may be an integer multiple of the pulse width of the reference clock signal. The primary controller 01 may add the reference clock signal and the synchronization signal in a time domain to generate a compound signal. Correspondingly, in a process in which the at least one node device 02 receives the compound signal, if a pulse width that is in a specific pulse cycle and that is greater than the pulse width of the reference clock signal is detected, it may be determined that a pulse of the synchronization signal is received. In other words, the at least one node device 02 may separate the reference clock signal and the synchronization signal from the compound signal based on a pulse width of the compound signal.

In the foregoing implementation, the primary controller 01 transmits the compound signal of the synchronization signal and the reference clock signal by using one clock signal cable. This can avoid an increase in a quantity of signal cables between adjacent devices in the ring network, and simplify a structure of the control system.

It should be understood that, in the foregoing implementation, the clock signal cable connected between two adjacent devices in the ring network may be a signal cable that can transmit both data and a clock signal. For example, the signal cable may be an Ethernet cable. Alternatively, for a time sensitive network (TSN), two adjacent devices in the ring network may be connected to both a data signal cable for transmitting data and a clock signal cable dedicated to transmitting a reference clock signal.

In another optional implementation, the primary controller 01 in the ring network may be connected to the at least one node device 02 by using the clock signal cable and the synchronization signal cable. That is, not only the primary controller 01 and the node device 02, but also the two adjacent node devices 02 are connected by using the clock signal cable and the synchronization signal cable. Refer to FIG. 7. In this implementation, the primary controller 01 may be configured to: send the reference clock signal to the at least one node device 02 by using the clock signal cable, and send the synchronization signal to the at least one node device 02 by using the synchronization signal cable. The at least one node device 02 may receive the reference clock signal by using the clock signal cable, and receive the synchronization signal by using the synchronization signal cable.

The primary controller 01 separately transmits the synchronization signal and the reference clock signal by using different signal cables, so that the at least one node device 02 does not need to parse the synchronization signal and the reference clock signal from a received compound signal. This reduces complexity of receiving the synchronization signal and the reference clock signal by the node device 02.

Figure 8:
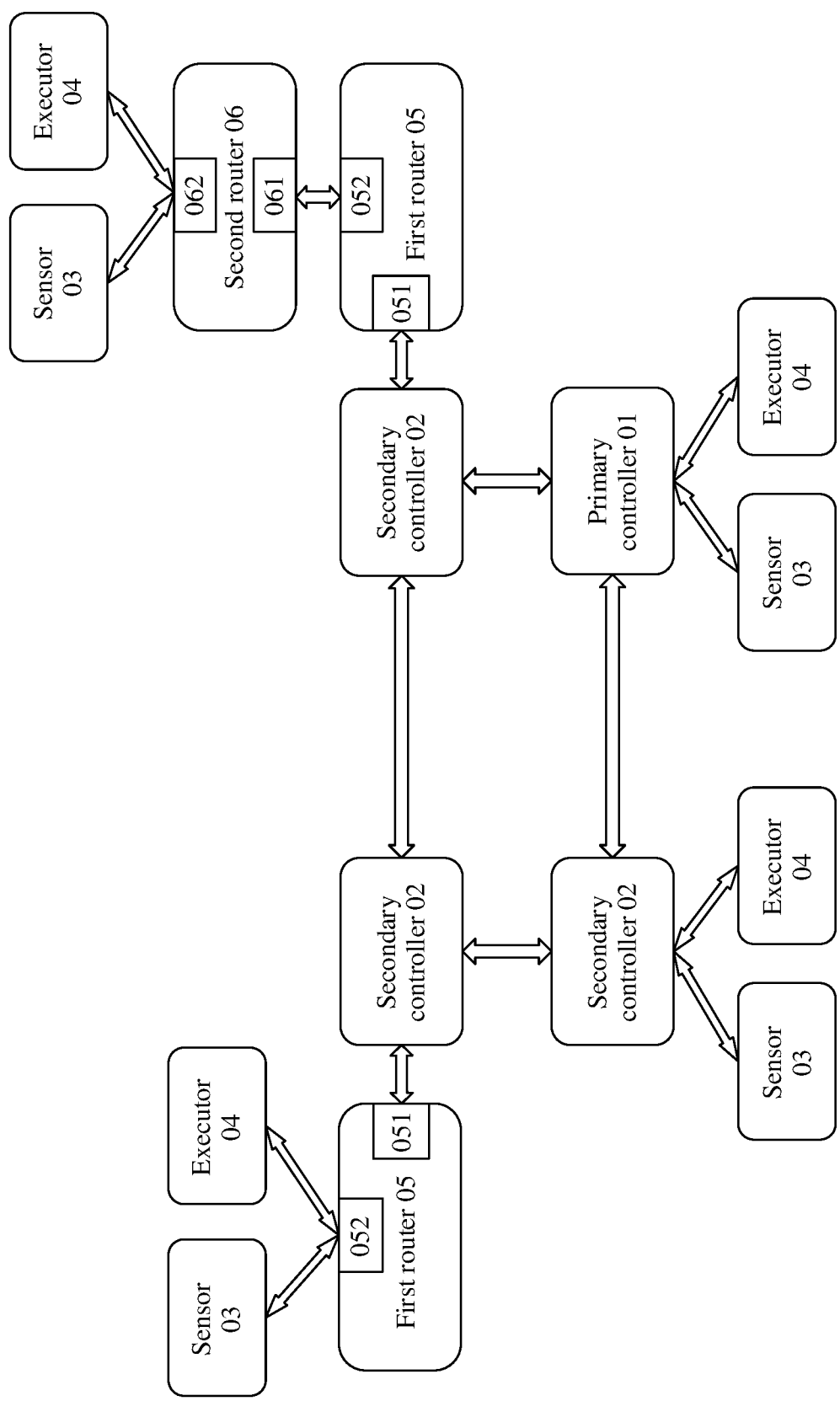
FIG. 8 is a schematic diagram of a structure of another control system according to an embodiment of this application.

Optionally, as shown in FIG. 8, the control system may further include at least one sensor 03 and at least one executor 04. The at least one sensor 03 may be connected to the primary controller 01 or a node device 02, and the at least one executor 04 may be connected to the primary controller 01 or a node device 02. The sensor 03 may be an image sensor, a speed sensor, a temperature sensor, a pressure sensor, a laser radar, an ultrasonic radar, or the like. The executor 04 may be a motor, a valve, a switch, a relay, or the like.

In a scenario in which the at least one node device 02 is at least one secondary controller, a task that needs to be executed by the primary controller 01 and a task that needs to be executed by the at least one secondary controller 02 each may include one or more of the following tasks: a data transmission task, a data processing task, a sending task of an instruction, and an output task of a drive signal. The instruction may be used to instruct the sensor 03 to collect data, or used to instruct to output the drive signal to the executor 04. Correspondingly, data transmission may be: transmitting data collected by the sensor 03. Data processing may be: processing data collected by the sensor 03.

In this embodiment of this application, a controller (which may be the primary controller 01 or the secondary controller 02) in the control system may directly generate a drive signal, and output the drive signal to the executor 04 connected to the controller, to drive the executor 04 to operate. Alternatively, the controller may be connected to the executor 04 by using a drive circuit. When the controller needs to drive the executor 04 to operate, the controller may send, to the drive circuit, an instruction used to instruct to output the drive signal. The drive circuit may further output the drive signal to the executor 04 based on the instruction, to drive the executor 04 to operate.

Optionally, the primary controller 01 may be further configured to: determine a task that needs to be executed by the primary controller 01 and an execution moment of the task, determine a task that needs to be executed by the at least one secondary controller 02 and an execution moment of the task, execute the task at the execution moment of the task that needs to be executed by the primary controller 01, and send a task scheduling table to the at least one secondary controller 02 by using the ring network. The task scheduling table received by the at least one secondary controller 02 may include the task that needs to be executed by the at least one secondary controller 02 and the execution moment of the task.

Correspondingly, the at least one secondary controller 02 may execute, based on the task scheduling table, the task at the execution moment corresponding to the task that needs to be executed by the at least one secondary controller 02.

In this embodiment of this application, the primary controller 01 may uniformly plan and schedule, by using a time division task (TDT) technology, the tasks that need to be executed by the primary controller 01 and the at least one secondary controller 02. Tasks that need to be executed by different controllers are allocated to different timeslots. In this way, the primary controller 01 and the at least one secondary controller 02 may execute each task in an orderly manner based on a preset task scheduling table, to avoid a problem such as resource preemption or contention that occurs when a plurality of tasks are simultaneously executed, and ensure that each task can be executed in an orderly and efficient manner.

For example, it is assumed that a task that needs to be executed by a specific controller (which may be the primary controller 01 or the secondary controller 02) includes a sending task of an instruction and a data transmission task, and the instruction is used to instruct the sensor 03 to collect data. In this case, an execution moment of the sending task of the instruction recorded in the task scheduling table is a collection time point, and an execution moment of the data transmission task is a sending time point of the data. Correspondingly, when detecting that the collection time point arrives, the controller may automatically send an instruction to the sensor 03 connected to the controller,to instruct the sensor 03 to collect the data. In addition, after obtaining the data collected by the sensor 03, the controller may automatically send the data when detecting that the sending time point arrives.

It should be understood that, if the control system includes a plurality of different types of sensors 03 that need to synchronously collect data, the primary controller 01 may set, to a same moment, execution moments of tasks used to instruct the sensor 03 to collect data. In other words, the controller in the ring network may send, to the sensor 03 at a same moment, an instruction used to instruct to collect data.

For example, sensors that need to synchronously collect data in the control system may include a sensor that collects a rotor position during field oriented control (FOC) of a permanent-magnet synchronous motor (PMSM) and a sensor that collects a phase current physical dependency signal, may include sensors for collecting convergent data such as a laser radar, an ultrasonic radar, and a visible light image sensor, or may include a plurality of sensors for redundancy check.

Optionally, the primary controller 01 may be further configured to generate a general task scheduling table. The general task scheduling table may include a task that needs to be executed by the primary controller 01 and an execution moment of the task, and a task that needs to be executed by the at least one secondary controller 02 and an execution moment of the task. In addition, the task scheduling table sent by the primary controller 01 to each secondary controller 02 may be the general task scheduling table. In a scenario in which the primary controller 01 directly sends the general task scheduling table to each secondary controller 02, it can be ensured that each secondary controller 02 can obtain a task that needs to be executed by another secondary controller 02 and an execution moment of the task, so that when the primary controller 01 is faulty, any secondary controller 02 can uniformly schedule and manage, based on the general task scheduling table, tasks that need to be executed by controllers in the control system, that is, any secondary controller 02 can quickly take over operation of the primary controller 01 based on the general task scheduling table.

Alternatively, the task scheduling table sent by the primary controller 01 to each secondary controller 02 may include only a task that needs to be executed by the secondary controller 02 and an execution moment of the task, and does not need to include a task that needs to be executed by another secondary controller 02 and an execution moment of the task. In this way, when the secondary controller 02 determines, from the task scheduling table, an execution moment of the task that needs to be executed by the secondary controller 02, interference by a task that needs to be executed by another controller is avoided.

Figure 9:
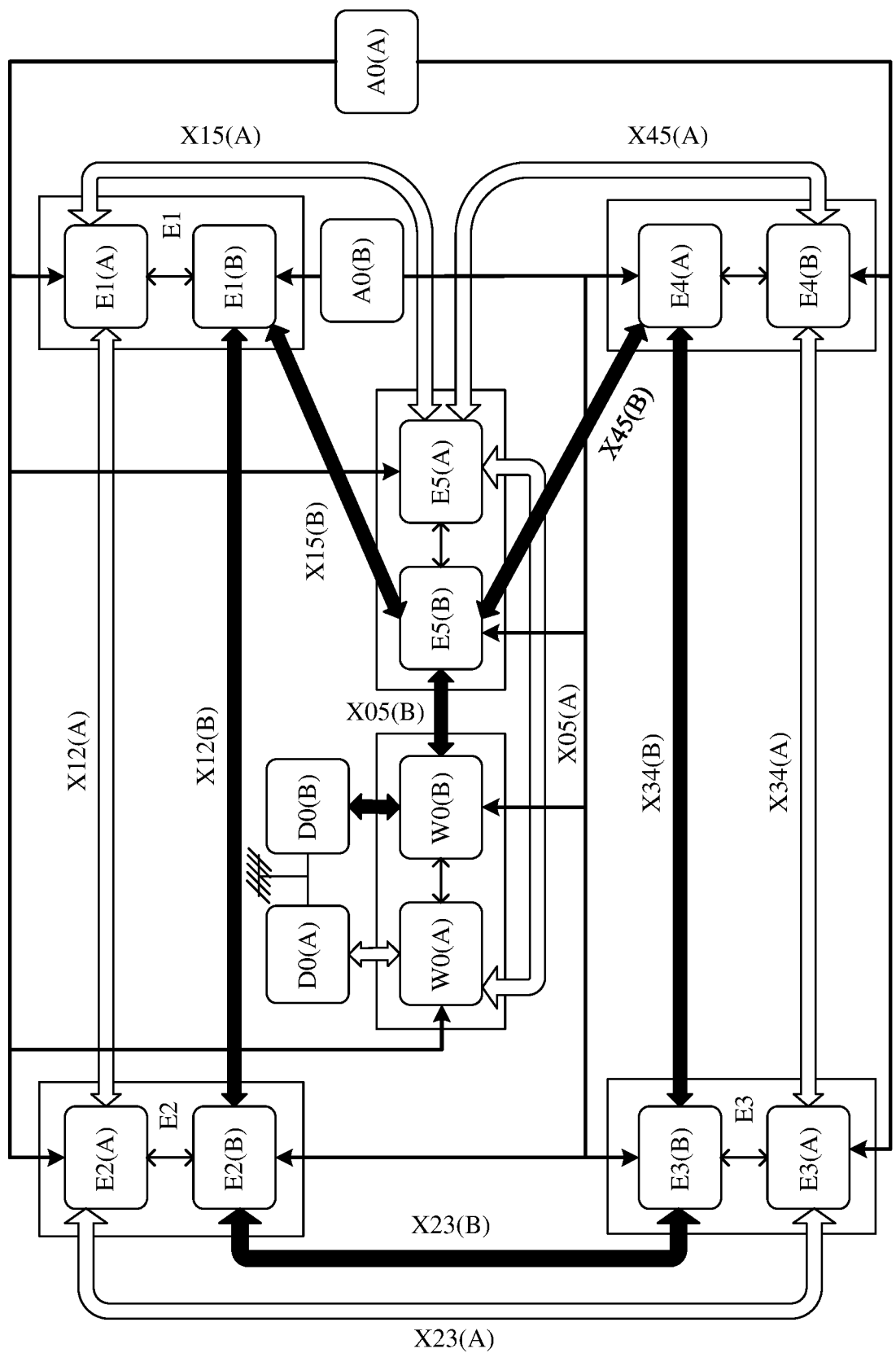
FIG. 9 is a schematic diagram of a structure of still another control system according to an embodiment of this application.

For example, it is assumed that, as shown in FIG. 9, the control system includes a primary controller E5 and four secondary controllers E1 to E4. A general task scheduling table generated by the primary controller E5 may be shown in Table 1. It can be learned from Table 1 that the secondary controller E1 needs to execute a task 1 at a moment t1, and the secondary controller E3 needs to execute a task 4 at a moment t4 and needs to execute a task 5 at a moment t5. In this case, the primary controller E5 may separately send the general task scheduling table shown in Table 1 to the secondary controller E1 to the secondary controller E4, or the primary controller E5 may specifically send only a part of content in Table 1 to each secondary controller. For example, a task scheduling table sent by the primary controller E5 to the secondary controller E1 may include only the task 1 and the execution moment t1 of the task 1. A task scheduling table sent by the primary controller E5 to the secondary controller E4 may include only a task 6 and an execution moment t6 of the task 6.

TABLE 1

|  | E1 | E2 | | E3 | E4 | E5 | | |
|---|---|---|---|---|---|---|---|---|
| Tasks | task 1 | task 2 | task 3 | task 4 | task 5 | task 6 | task 7 | task 8 | task 9 |
| Execution moments | t1 | t2 | t3 | t4 | t5 | t6 | t7 | t8 | t9 |

Optionally, each of the primary controller 01 and the at least one secondary controller 02 in the control system may be connected to the sensor 03 and/or the executor 04 that are/is physically close to the primary controller 01 and the at least one secondary controller 02. Different controllers may be loaded with different software modules and operating systems, but communication interfaces of different controllers may be the same, and computing resources of the different controllers may be shared.

Correspondingly, the primary controller 01 may be further configured to: divide a general data processing task into a plurality of data processing tasks, and determine, based on load of the primary controller 01 and load of the at least one secondary controller 02, a data processing task that needs to be executed by the primary controller 01 and a data processing task that needs to be executed by the at least one secondary controller 02.

In other words, for a general data processing task that requires a large quantity of computing resources, the primary controller 01 may schedule a plurality of controllers in the ring network to cooperatively execute the general data processing task. This can implement distributed execution of data processing tasks, and can further improve utilization of computing resources of the controller on the basis of improvement of task execution efficiency.

In addition, in this embodiment of this application, the primary controller 01 may further dynamically allocate the data processing tasks based on importance, a function requirement, a security requirement, and a performance impact degree of each data processing task. This effectively improves flexibility of task scheduling, and implements proper utilization of computing resources of each controller.

Optionally, the secondary controller 02 in the control system may further store a priority list, and the priority list includes a priority of the at least one secondary controller 02. The at least one secondary controller 02 may be further configured to: if it is determined that the primary controller 01 is faulty or any signal cable connected to the primary controller 01 is faulty, determine a new primary controller from the at least one secondary controller 02 based on the priority list. Then, the new primary controller may perform unified scheduling management on a plurality of controllers in the control system, to be specific, a primary control right of the control system may be handed over to the new primary controller, to ensure that the control system can still properly run.

For example, with reference to FIG. 9, it is assumed that priorities of the four secondary controllers E1 to E4 in the priority list are: E4>E3>E2>E1, and when the primary controller E5 is faulty, the secondary controller E4 may operate in place of the primary controller E5.

It should be understood that the primary controller 01 may also store the priority list. In addition, in addition to the priority of the at least one secondary controller 02, the priority list may further record a priority of the primary controller 01, and the priority of the primary controller 01 may be higher than the priority of the at least one secondary controller 02. In this way, it can be ensured that the primary controller 01 can re-obtain the primary control right of the control system after the primary controller 01 recovers from a fault state.

Optionally, a fault detection algorithm is configured in both the primary controller 01 and the at least one secondary controller 02. The primary controller 01 and the at least one secondary controller 02 may detect, based on the fault detection algorithm, whether the primary controller 01 or a signal cable connected to the primary controller 01 is faulty. For example, the primary controller 01 may periodically send a heartbeat message to the at least one secondary controller 02 based on a preset periodicity. If none of the at least one secondary controller 02 receives the heartbeat message in a specific periodicity, the at least one secondary controller 02 can determine that the primary controller 01 is faulty. If some secondary controllers 02 do not receive the heartbeat message in a specific periodicity, but the remaining secondary controllers 02 receive the heartbeat message, the at least one secondary controller 02 can determine that the primary controller 01 is not faulty. However, signal cables between the primary controller 01 and some secondary controllers 02 are faulty.

In this embodiment of this application, after receiving data sent by another controller, the controller in the control system (which may be the primary controller 01 or the secondary controller 02) may compare an identifier (ID) of the received data with an ID of the controller. If the ID of the data is the same as the ID of the controller, the controller may perform receiving processing on the received data. If the ID of the data is different from the ID of the controller, the controller may forward the received data. In addition, to ensure that the data can be effectively transmitted to a receiving end, the controller may further drive (for example, shape and amplify) the data before forwarding the data.

Optionally, the ring network may transmit data through a shared bus. That is, at each moment, only one of the primary controller 01 and the at least one secondary controller 02 can serve as a transmitting end to send data, and the remaining controllers serve as receiving ends to only receive data. For example, only the secondary controller E1 can send data at a specific moment, and the secondary controller E2 to the secondary controller E4 and the primary controller E5 all receive data. Alternatively, the ring network may also be a packet network, that is, the primary controller 01 and the at least one secondary controller 02 included in the control system may be divided into a plurality of groups, and each group includes at least two controllers. At each moment, controllers in different groups can simultaneously exchange data. For example, it is assumed that the secondary controller E1 and the secondary controller E2 form a group, and the secondary controller E3 and the secondary controller E4 form a group. At a specific moment, the secondary controller E1 may send data to the secondary controller E2, and the secondary controller E3 may send data to the secondary control E4.

Optionally, the controller (which may be the primary controller 01 or the secondary controller 02) in the control system may be further configured to: send target data to another controller by using the ring network, and if the target data transmitted by using the ring network is not received, or received target data transmitted by using the ring network is inconsistent with the target data sent by the controller, perform fault detection on the ring network, and/or resend the target data.

The target data may be data that has a high requirement on security and that needs to be shared by a plurality of controllers included in the ring network. For example, the target data may include a vehicle speed. In other words, after sending, by using the ring network, the target data that has a high security requirement, the primary controller 01 or the secondary controller 02 may detect whether another controller in the ring network correctly receives the target data. In this way, it can be ensured that the target data can be reliably transmitted to a receiver.

For example, it is assumed that the ring network includes the primary controller 01 and m−1 secondary controllers 02, that is, the ring network includes m controllers in total. In this case, all target data sent by the controllers in the ring network needs to be forwarded m times before being sent back to the controllers again. Herein, m is an integer greater than 1. If duration for transmitting target data between two adjacent controllers is n clock cycles, after sending the target data, the controllers in the ring network may detect whether data received after n×m clock cycles is consistent with the target data, to verify data integrity. If the controllers receive no data after the n×m clock cycles, or received data is inconsistent with the target data, the controllers may perform fault detection on the ring network, and/or resend the target data.

A process in which the controller performs fault detection on the ring network may include: The controller sends detection data to another controller in the ring network, and after receiving the detection data, the another controller in the ring network feeds back response data to a sender of the detection data, and finally, the sender of the detection data may determine, based on the received response data, a faulty controller or a faulty signal cable.

In a scenario in which the at least one node device 02 is a secondary controller, as shown in FIG. 8, the control system may further include at least one first router 05. A first port 051 of the first router 05 is connected to the primary controller 01 or the secondary controller 02. A second port 052 of the first router 05 is connected to at least one sensor 03 and/or at least one executor 04. A data transmission rate of the first port 051 is lower than a data transmission rate of the ring network, and a data transmission rate of the second port 052 is lower than the data transmission rate of the first port 051.

A controller connected to the at least one first router 05 is further configured to: perform frequency division on a frequency of the reference clock signal transmitted in the ring network, and send a frequency-divided reference clock signal to the at least one first router 05.

The at least one first router 05 may be configured to perform timing based on a frequency of the received frequency-divided reference clock signal and execute a task. The task executed by the at least one first router 05 may include at least: exchanging, through the first port 051, data with the controller connected to the at least one first router 05, and exchanging, through the second port 052, data with the at least one sensor 03 and/or the at least one executor 04 connected to the at least one first router 05.

Based on the foregoing description, it can be learned that the primary controller 01 and the secondary controller 02 may transmit data in the ring network at a higher data transmission rate, and perform timing at a higher frequency. In addition, the primary controller 01 or the secondary controller 02 connected to the first router 05 may transmit data to the first router 05 after reducing the data transmission rate, and may send a reference clock signal to the first router 05 after reducing the frequency of the reference clock signal. Similarly, the first router 05 may send data to the controller connected to the first router 05 after increasing the data transmission rate.

Therefore, in this embodiment of this application, the sensor 03 (for example, an image sensor) and/or the executor 04 that have/has a high requirement on a data transmission rate may be directly connected to a controller in the ring network. The controller sends an instruction at a higher frequency of the reference clock signal, and transmits data at a higher data transmission rate. The sensor 03 (for example, a sound sensor) and/or an executor 04 that have/has a general requirement on a data transmission rate may be connected to the first router 05. The first router 05 sends an instruction at a medium frequency of the reference clock signal, and transmits data at a medium data transmission rate. Therefore, the control system provided in this embodiment of this application may be compatible with different types of sensors and executors. This effectively improves application flexibility of the control system.

Still refer to FIG. 8. The control system may further include at least one second router 06. A third port 061 of the second router 06 is connected to the second port 052 of the first router 05. A fourth port 062 of the second router 06 is connected to the at least one sensor 03 and/or at least one executor 04. A data transmission rate of the third port 061 is equal to the data transmission rate of the second port 052, and a data transmission rate of the fourth port 062 may be lower than the data transmission rate of the third port 061.

The first router 05 connected to the second router 06 may be further configured to: perform frequency division on a frequency of a reference clock signal received through the first port 051, and send, through the second port 052, a frequency-divided reference clock signal to the second router 06 connected to the first router 05.

The at least one second router 06 may be configured to perform timing based on a frequency of the reference clock signal sent by the first router 05 and execute a task. The task executed by the second router 06 may include at least: exchanging data with the at least one first router 05 through the third port 061, and exchanging, through the fourth port 062, data with the at least one sensor 03 and/or at least one executor 04 connected to the second router 06.

Based on the foregoing description, it can be learned that the first router 05 may transmit data to the second router 06 after reducing a data transmission rate, and may send a reference clock signal to the second router 06 after reducing a frequency of the reference clock signal. Similarly, the second router 06 may send data to the first router 05 after increasing the data transmission rate. Therefore, in the control system, the sensor 03 (for example, a water temperature sensor) and/or the executor 04 that have/has a low requirement on a data transmission rate may be connected to the second router 06. The second router 06 sends an instruction at a lower frequency of the reference clock signal, and transmits data at a lower data transmission rate.

Based on the foregoing value relationship between the data transmission rate and the frequency of the reference clock signal, it can be learned that the ring network may be referred to as a high-speed ring network, the first router 05 may be referred to as a medium-speed router, and the second router 06 may be referred to as a low-speed router. In other words, the control system uses the primary controller 01 and the at least one secondary controller 02 in the ring network as root nodes, and forms a tree structure through combination of cascaded routers of various levels. It can be understood that the control system may further include more other low-level routers connected to the second router 06. This is not limited in this embodiment of this application.

According to the control system provided in this embodiment of this application, the first router 05 and the second router 06 may be used, to gradually reduce a data transmission rate and a frequency of the reference clock signal, so that controllers (including the primary controller 01 and the secondary controller 02), the first router 05, and the second router 06 in the ring network can execute an instruction based on different frequencies of the reference clock signal. In this way, application flexibility and compatibility of the control system are effectively improved. In addition, a plurality of routers of different levels are disposed. This can ensure smooth transition of the data transmission rate and the frequency of the reference clock signal, and further ensure stability of data transmission.

Figure 10:
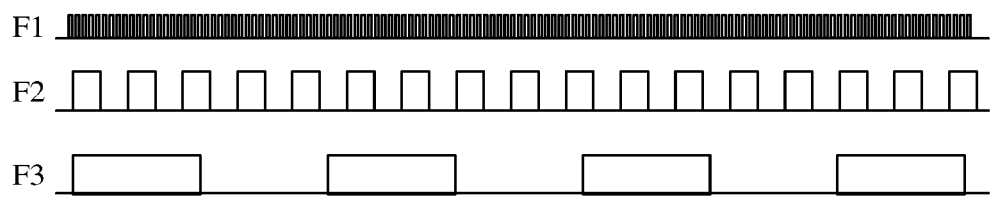
FIG. 10 is a schematic diagram of frequencies of reference clock signals according to an embodiment of this application.

It should be understood that, in the control system, the primary controller 01, the secondary controller 02, and the first router 05 may all perform frequency division on the reference clock signal based on a preset frequency division value. For example, refer to FIG. 10. It is assumed that a frequency of a reference clock signal sent by the primary controller 01 to the at least one secondary controller 02 in the ring network is F1, a frequency F2 of a reference clock signal sent by any controller in the ring network to the first router 05 connected to the controller may meet the following: F2=F1/N1, and a frequency F3 of a reference clock signal sent by the first router 05 to the second router 06 may meet the following: F3=F2/N2. Both N1 and N2 may be integers greater than 1, and N1 and N2 may be equal or unequal. For example, a value range of the frequency F1 may be 1 GHz to 10 GHz, a value range of the frequency F2 may be 100 megahertz (MHz) to 500 MHz, and a value range of the frequency F3 may be 10 MHz to 20 MHz.

Figure 11:
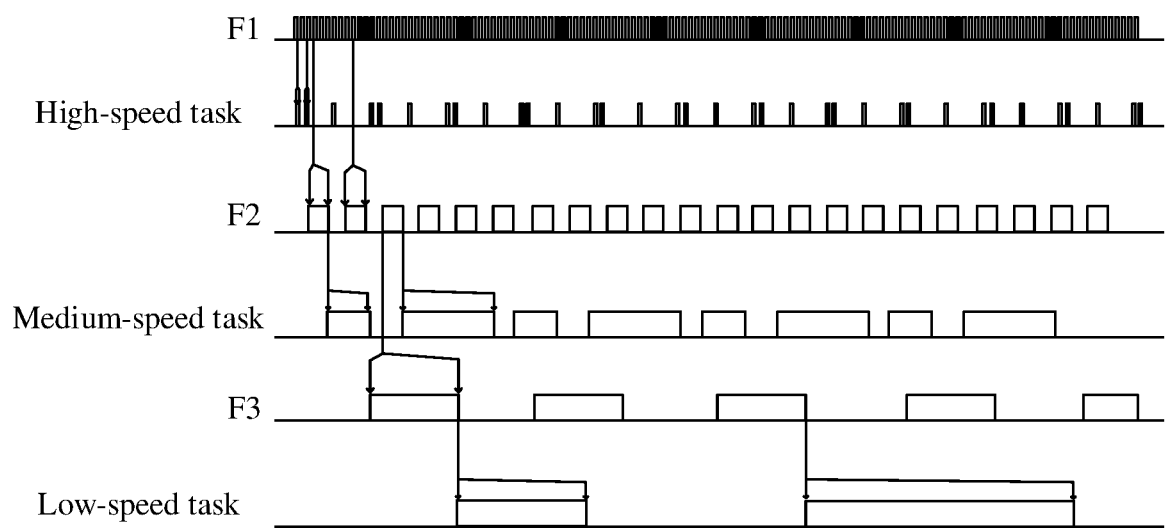
FIG. 11 is a schematic diagram of frequencies of reference clock signals and different rates of tasks according to an embodiment of this application.

Correspondingly, as shown in FIG. 11, the primary controller 01 and the at least one secondary controller 02 in the ring network may execute a high-speed task based on a reference clock signal whose frequency is F1. The at least one first router 05 may execute a medium-speed task based on a reference clock signal whose frequency is F2. The at least one second router 06 may execute a low-speed task based on a reference clock signal whose frequency is F3.

It should be further understood that a frequency division value configured in the primary controller 01, a frequency division value configured in the at least one secondary controller 02, and a frequency division value configured in the first router 05 may all be dynamically configured by the primary controller 01 based on a rate requirement of a to-be-executed task.

In this embodiment of this application, the primary controller 01 may allocate, based on rate requirements of to-be-executed tasks, tasks with different rate requirements to devices (including the primary controller, the secondary controller, the first router, and the second router) of different levels for execution. In addition, an execution timeslot (that is, an execution moment) of a task may be dynamically allocated by the primary controller 01. This effectively improves flexibility of task execution. In addition, in a task execution process, the secondary controller 02, the first router 05, and the second router 06 may further monitor running time of the task, and report a monitoring result to the primary controller 01. When the primary controller 01 needs to allocate a new task, the primary controller 01 may determine, based on a time sequence in a general task scheduling table, the received monitoring result of the task, and load of each controller in the ring network, a controller for executing the new task and an execution moment of the new task. In this way, dynamic allocation of computing resources and communication resources in the control system can be implemented.

It should be further understood that, for any one of the at least one first router 05 and the at least one second router 06, if an instruction received by the router is an instruction used to instruct to collect data, the router may directly forward the instruction to a sensor 03 connected to the router, to instruct the sensor 03 to collect data. If the instruction received by the router is an instruction used to instruct to output a drive signal, and the router includes a drive circuit, the router may directly execute the instruction. That is, the router may output, based on a frequency of a received reference clock signal, the drive signal to an executor 04 connected to the router. If the instruction received by the router is an instruction used to instruct to output a drive signal, and the router does not include a drive circuit, the router may directly forward the instruction to a drive circuit of the executor 04. After receiving the instruction, the drive circuit can generate a drive signal, and output the drive signal to the executor 04.

It should be understood that, in this embodiment of this application, both the primary controller 01 and the secondary controller 02 may be connected to one or more first routers 05, and each first router 05 may also be connected to one or more second routers 06. For example, refer to FIG. 12. Each of secondary controllers E1 to E4 is connected to two first routers. For example, the secondary controller E1 is connected to two first routers M1, and the secondary controller E2 is connected to two first routers M2. The primary controller E5 is connected to a first router M5. In addition, each of the first routers M1 to M4 is connected to three second routers. For example, the first router M1 is connected to three second routers L1, and the first router M4 is connected to three second routers L4. The first router M5 is not connected to the second router.

Figure 13:
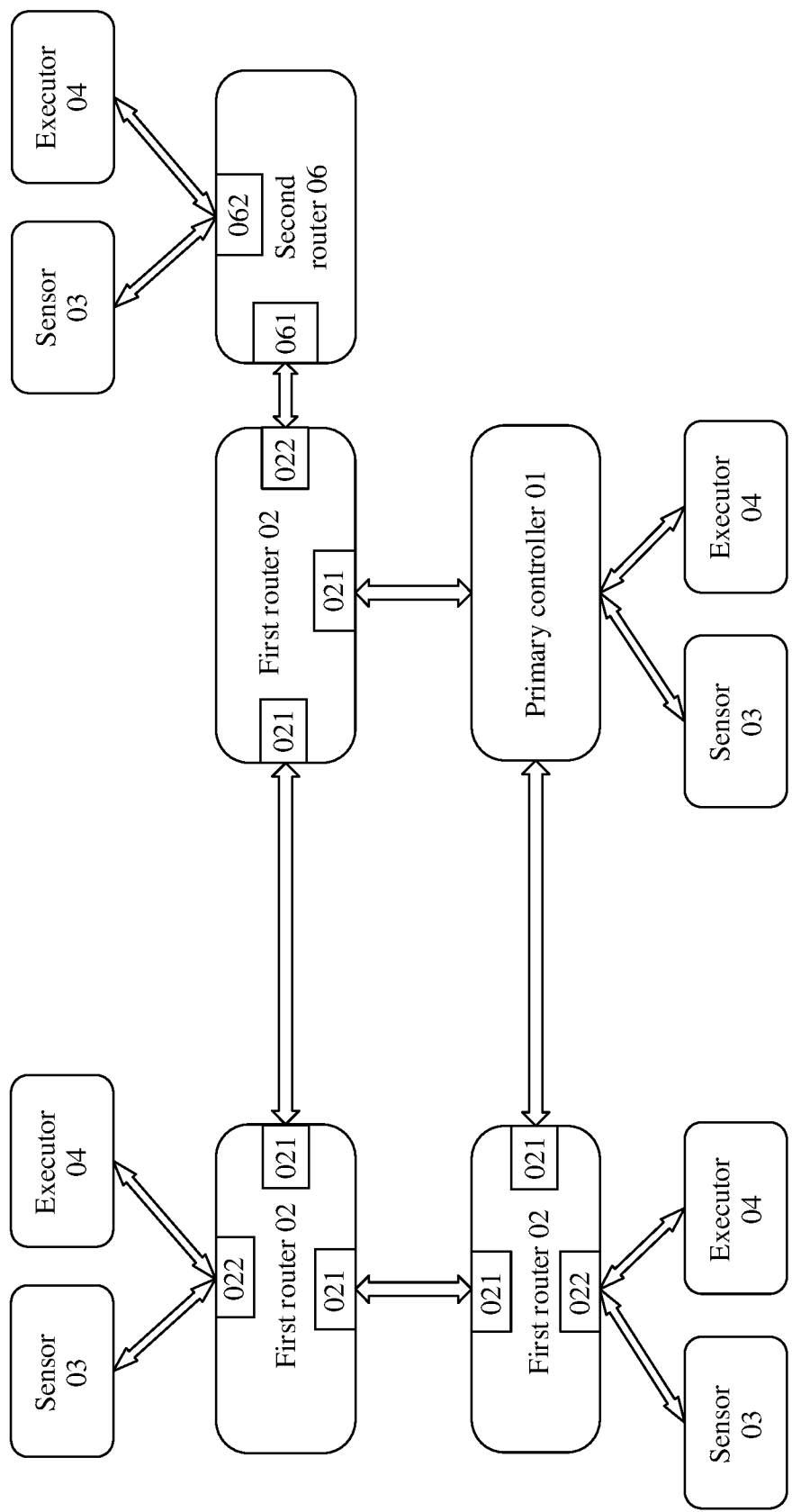
FIG. 13 is a schematic diagram of a structure of yet another control system according to an embodiment of this application.

Refer to FIG. 13. In a scenario in which at least one node device 02 is at least one first router 02, at least one sensor 03 in the control system may be connected to the primary controller 01 or the at least one first router 02. At least one executor 04 in the control system may be connected to the primary controller 01 or the at least one first router 02.

A task that needs to be executed by the primary controller 01 includes one or more of the following tasks: a data transmission task, a data processing task, a sending task of an instruction, and an output task of a drive signal. A task that needs to be executed by the at least one first router 02 may include one or more of the following tasks: a data transmission task, a sending task of an instruction, and an output task of a drive signal. The instruction may be used to instruct the sensor 03 to collect data, or used to instruct to output the drive signal to the executor 04.

In the scenario in which at least one node device 02 is at least one first router 02, the primary controller 01 can implement centralized control on devices in the control system. Because most software functions may be moved up to the primary controller 01, a conventional ECU may be transformed into the first router 02. The first router 02 only needs to collect data and output a drive signal, or forward an instruction according to an instruction of the primary controller 01 and a strict time sequence. Therefore, compared with the conventional ECU, a hardware structure of the first router 02 can be effectively simplified, and costs can be significantly reduced. For example, the first router 02 only needs to retain circuits such as an analog amplification circuit, an ADC, a timer, a PWM circuit, and a communication interface, and does not need to retain a circuit for implementing data processing, for example, a processor.

Optionally, as shown in FIG. 13, the first router 02 may be connected to the primary controller 01 through a first port 021 of the first router 02, to be specific, the first router 02 may access a ring network through the first port 021 of the first router 02. In addition, the control system may further include at least one second router 06. A third port 061 of the second router 06 is connected to a second port 022 of the first router 02, and a fourth port 062 of the second router is connected to the at least one sensor 03 and/or at least one executor 04. A data transmission rate of the first port 021 is equal to a data transmission rate of the ring network, a data transmission rate of the second port 022 is lower than the data transmission rate of the first port 021, a data transmission rate of the third port 061 is equal to the data transmission rate of the second port 022, and a data transmission rate of the fourth port 062 is lower than the data transmission rate of the third port 061.

In addition, the first router 02 connected to the second router 06 may be further configured to: perform frequency division on a frequency of the reference clock signal, and send a frequency-divided reference clock signal to the second router 06.

The at least one second router 06 may be configured to perform timing based on the frequency of the reference clock signal sent by the first router 02 and execute a task. The task executed by the at least one second router 06 may include at least: exchanging data with the at least one first router 02 through the third port 061, and exchanging, through the fourth port 062, data with the at least one sensor 03 and/or at least one executor 04 connected to the at least one second router 06.

Figure 14:
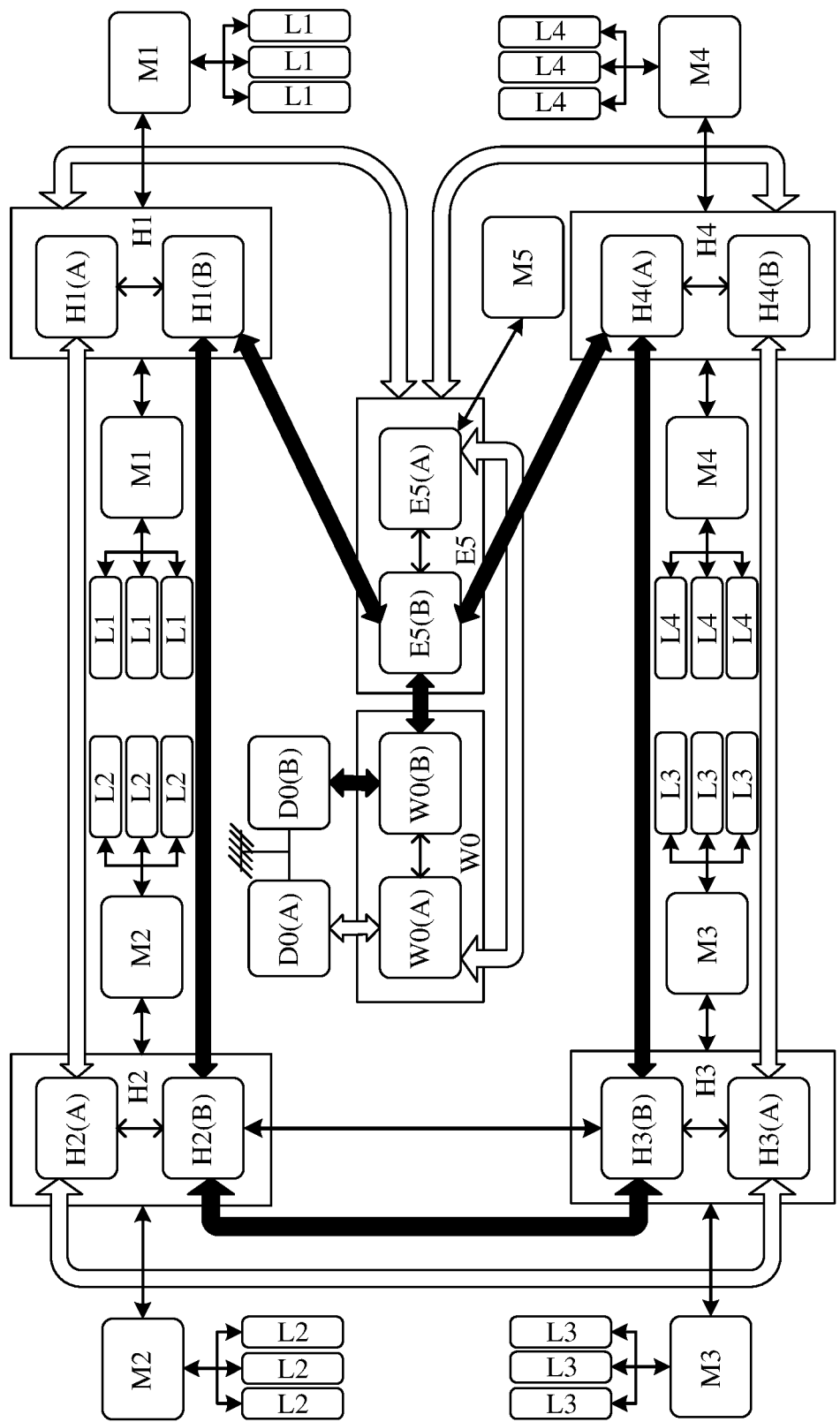
FIG. 14 is a schematic diagram of a structure of yet another control system according to an embodiment of this application.

For example, as shown in FIG. 14, the control system may include a primary controller E5 and four first routers H1 to H4 in total. Each first router is further connected to two second routers. For example, the first router H1 is connected to two second routers M1, and the first router H3 is connected to two second routers M3.

It should be understood that, in a scenario in which at least one node device 01 is the first router, the control system may further include at least one third router connected to the second router 06. Correspondingly, the second router 06 may perform frequency division on a frequency of a reference clock signal sent by the first router 02, and send a frequency-divided reference clock signal to the third router. The third router may further perform timing based on a frequency of the reference clock signal sent by the second router 06 and execute a task.

For example, refer to FIG. 14. Each second router is connected to three third routers. For example, a second router M2 is connected to three third routers L2, and a second router M4 is connected to three third routers L4. It can be understood that the control system may further include more other low-level routers connected to the third router. This is not limited in this embodiment of this application.

Based on the foregoing value relationship between the data transmission rate and the frequency of the reference clock signal, it can be learned that the first router 02 in the control system may be referred to as a high-speed router, the second router 06 may be referred to as a medium-speed router, and the third router may be referred to as a low-speed router. In other words, the control system can use the primary controller 01 as a centralized controller, use the primary controller 01 and the at least one first router 02 as root nodes, and form a tree structure through combination of other low-level routers such as the second router and the third router.

Optionally, in this embodiment of this application, the primary controller 01 may further monitor an execution moment at which the primary controller 01 executes a task, and monitor an execution moment at which the node device 02 executes a task. For example, the primary controller 01 may monitor an execution moment of a task by using a watchdog timer (watchdog timer). The primary controller 01 may be further configured to: if it is detected that any task is not executed at an execution moment of the any task, perform a fault response operation. The fault response operation may include one or more of the following operations:

restarting a device for executing the any task, where the device may be the primary controller 01 or the at least one node device 02;

restarting a sensor 03 and/or an executor 04 connected to the device for executing the any task; and executing a security task configured in the primary controller 01.

The security task is a task that can enable the control system to enter a secure state. A type of the security task varies based on different application scenarios. For example, for a vehicle control system, the security task may be a redundant switching task, a deceleration task, or a pull-over task. For another type of control system, the security task may be a redundant switching task, a system diagnosis and protection task, and the like.

The redundant switching task may be: allocating, to another device, a task that needs to be executed by the device for executing the any task. For example, if the primary controller 01 determines that a secondary controller for executing the any task is a faulty controller, the primary controller 01 may instruct another secondary controller to execute a related task of the faulty secondary controller. Optionally, the primary controller 01 may further determine, based on a state of the restarted device, or a state of the restarted sensor 03 and/or a state of the restarted executor 04, whether to instruct the restarted device to execute the any task again.

For example, it is assumed that t6>t5 in the general task scheduling table shown in Table 1. If the primary controller 01 detects that the task 6 is executed before the task 5 due to an execution moment error, the secondary controller E4 may be restarted. Alternatively, the sensor 03 and the executor 04 connected to the secondary controller E4 are restarted. In the control system provided in this embodiment of this application, the primary controller 01 can perform a fault response operation in time when detecting that an error occurs at a task execution moment, thereby effectively ensuring security and reliability of the control system.

Optionally, in the control system provided in this embodiment of this application, the primary controller 01 may include a primary control module and a secondary control module connected to the primary control module. The at least one node device 02 may include a primary node module and a secondary node module connected to the primary node module. In addition, the ring network may include a first ring subnet and a second ring subnet. The first ring subnet includes the primary control module and the primary node module in the at least one node device 02, and the second ring subnet includes the secondary control module and the secondary node module in the at least one node device 02. In other words, the primary control module and the primary node module in the at least one node device 02 may be sequentially connected to form the first ring subnet in the ring network. The secondary control module and the secondary node module in the at least one node device 02 may be sequentially connected to form the second ring subnet in the ring network.

Functions of the primary control module and the secondary control module may be the same, and the two control modules may operate in parallel. In addition, each of the primary control module and the secondary control module may be a processing chip. Similarly, functions of the primary node module and the secondary node module may be the same, and the two node modules may operate in parallel. In addition, if the node device 02 is a secondary controller, each of the primary node module and the secondary node module may be a processing chip. If the node device 02 is a first router, each of the primary node module and the secondary node module may be a forwarding chip.

Figure 12:
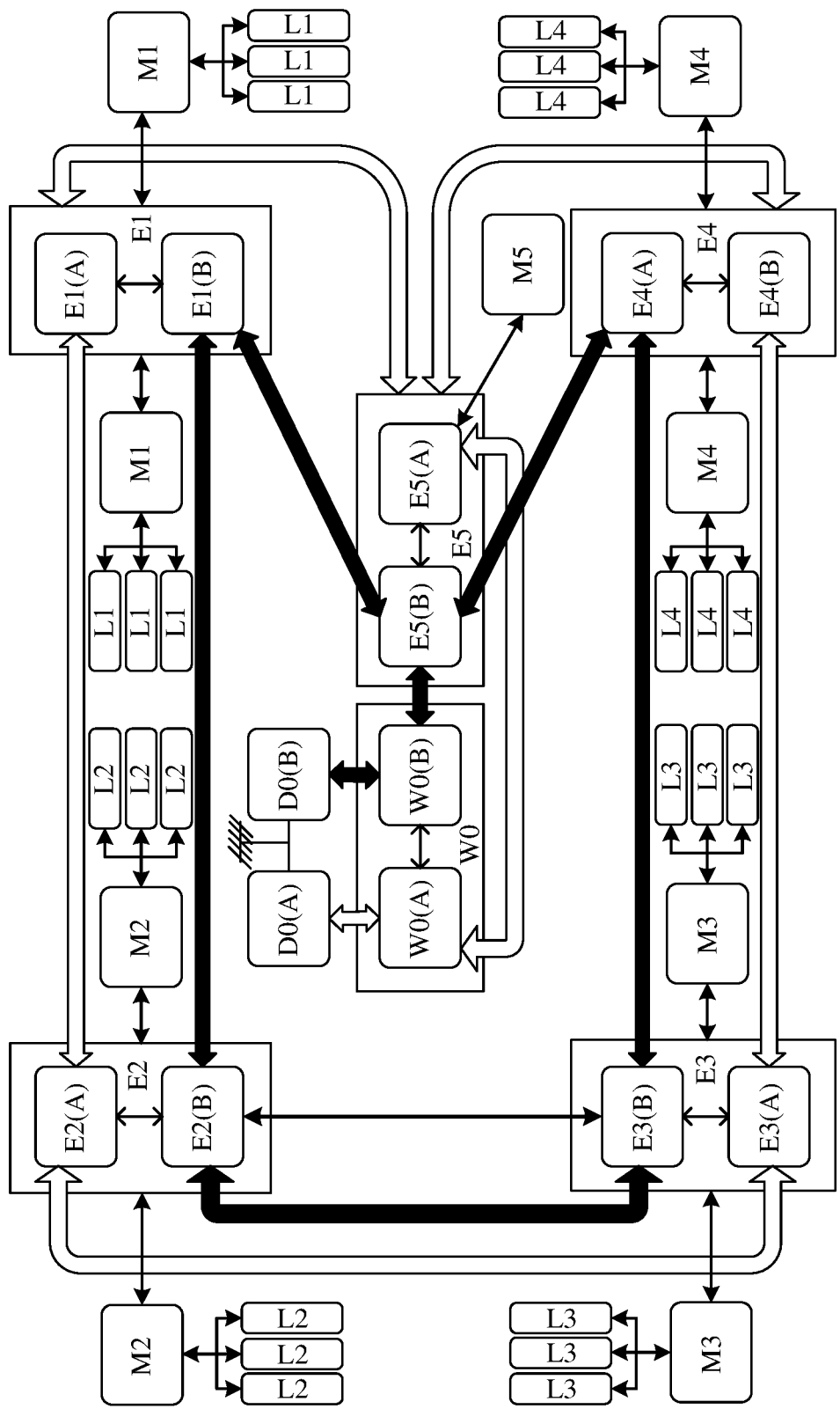
FIG. 12 is a schematic diagram of a structure of still another control system according to an embodiment of this application.

For example, refer to FIG. 9, FIG. 12, and FIG. 14. The primary controller E5 includes a primary control module E5(A) and a secondary control module E5(B). In a scenario in which the node device 02 is a secondary controller, as shown in FIG. 9 and FIG. 12, in secondary controllers E1 to E4, a secondary controller Em includes a primary node module Em(A) and a secondary node module Em(B). In a scenario in which the node device 02 is a first router, as shown in FIG. 14, in first routers H1 to H4, a first router Hm includes a primary node module Hm(A) and a secondary node module Hm(B). m represents serial numbers of four node devices 02, that is, m is an integer greater than or equal to 1 and less than or equal to 4. For example, the secondary controller E1 includes a primary node module E1(A) and a secondary node module E1(B).

Refer to FIG. 9. For example, the node device 02 is a secondary controller. The primary control module E5(A) and primary node modules of four secondary controllers may be sequentially connected by using signal cables X15(A), X12(A), X23(A), X34(A), and X45(A), to form the first ring subnet in the ring network. The secondary control module E5(B) and secondary node modules of four secondary controllers may be sequentially connected by using signal cables X15(B), X12(B), X23(B), X34(B), and X45(B), to form the second ring subnet in the ring network.

In the control system provided in this embodiment of this application, functions of the secondary control module and the primary control module may be the same, and functions of the secondary node module and the primary node module may also be the same. Therefore, the secondary control module may also be referred to as a redundant control module, and the secondary node module may also be referred to as a redundant node module. Correspondingly, both a signal cable between the secondary control module and the primary control module and a signal cable between the primary node module and the secondary node module may also be referred to as redundant signal cables. The redundant control module and the redundant node module are used, to ensure reliability of the primary controller and the node device during operation, thereby improving reliability of the entire control system.

It should be understood that, the primary control module and the secondary control module in the primary controller 01 each have a local clock signal, and the reference clock signal may be obtained based on a local clock signal of the primary control module in the primary controller 01. In other words, the local clock signal of the primary control module in the primary controller 01 may be used as a clock reference of the entire control system. For example, the reference clock signal may be the local clock signal of the primary control module in the primary controller 01, or the reference clock signal may be a clock signal obtained by performing frequency division on the local clock signal of the primary control module in the primary controller 01.

Correspondingly, the primary control module in the primary controller 01 may be configured to: send the reference clock signal to the primary node module in the at least one node device 02 by using the first ring subnet, and send the reference clock signal to the secondary control module in the primary controller 01.

The secondary control module in the primary controller 01 is configured to send the reference clock signal to the secondary node module in the at least one node device 02 by using the second ring subnet. Alternatively, the primary node module in the at least one node device 02 may be configured to send the reference clock signal to the secondary node module connected to the primary node module. In other words, the reference clock signal received by the secondary node module in the node device 02 may be sent by the primary node module connected to the secondary node module, or may be sent by the secondary control module in the primary controller 01 by using the second ring subnet.

Figure 15:
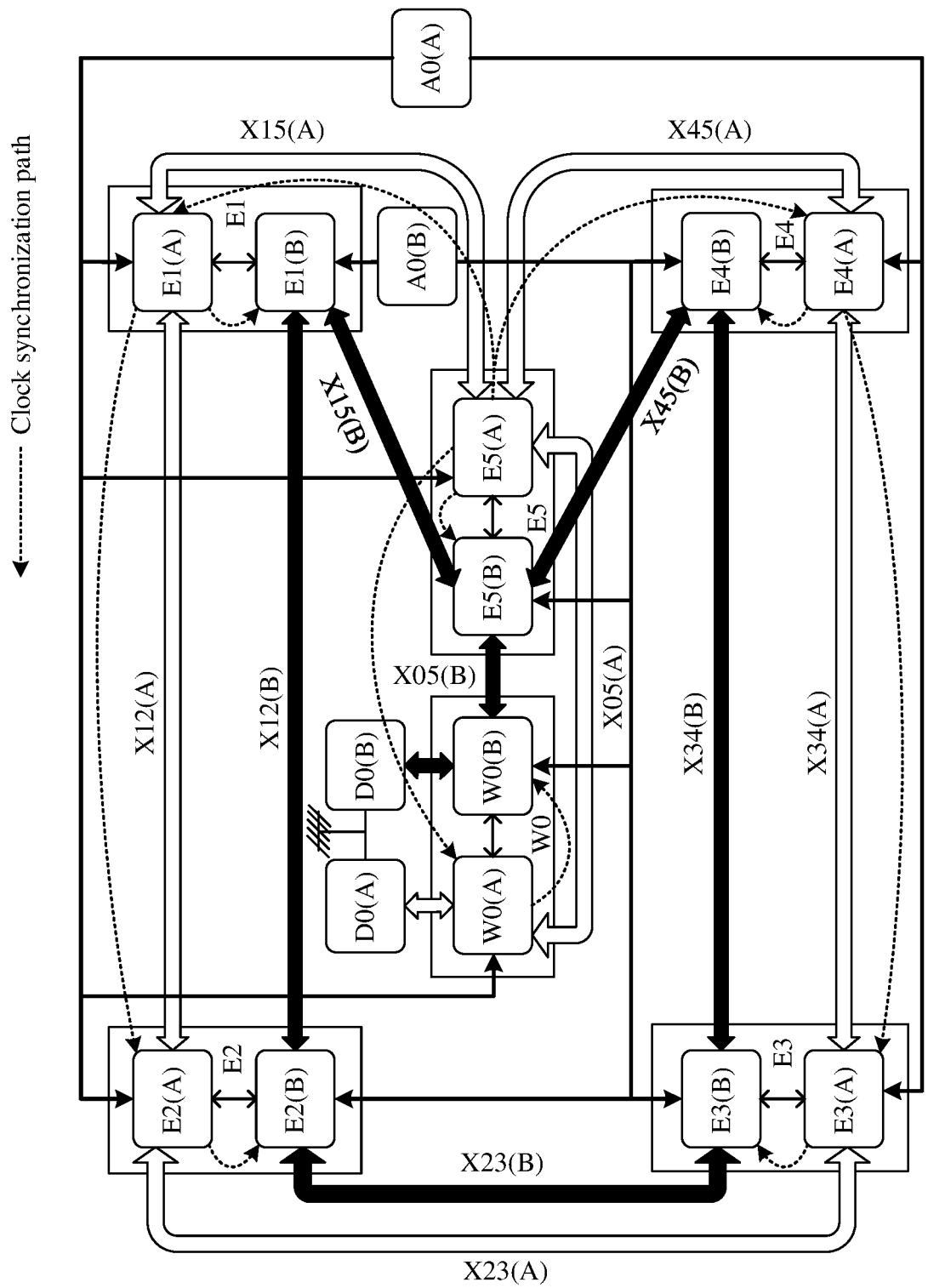
FIG. 15 is a schematic diagram of a clock synchronization path according to an embodiment of this application.

For example, FIG. 15 is a schematic diagram of a clock synchronization path. Refer to FIG. 15. A primary control module E5(A) of a primary controller E5 may separately send a reference clock signal to a secondary control module E5(B), a primary node module E1(A) of a secondary controller E1, and a primary node module E4(A) of a secondary controller E4. Then, the primary node module E1(A) of the secondary controller E1 may separately send the reference clock signal to a secondary node module E1(B) and a primary node module E2(A) of a secondary controller E2. Similarly, the primary node module E4(A) of the secondary controller E4 may also separately send the reference clock signal to a secondary node module E4(B) and a primary node module E3(A) of a secondary controller E3. Finally, the primary node module E2(A) of the secondary controller E2 may send the reference clock signal to a secondary node module E2(B), and the primary node module E3(A) of the secondary controller E3 may send the reference clock signal to a secondary node module E3(B). Thus, clock synchronization of the entire control system can be implemented.

It should be understood that transmission directions of signals (including a reference clock signal, data, an instruction, and the like) transmitted in the first ring subnet and the second ring subnet may be the same or different. For example, a transmission direction of a signal transmitted in the first ring subnet may be clockwise, and a transmission direction of a signal transmitted in the second ring subnet may be counterclockwise.

With reference to FIG. 15, it can be learned that in the control system, when a control module (which may be the primary control module or the secondary control module) in the primary controller 01 transmits a signal, there may be three transmission directions: clockwise transmission in a ring subnet, counterclockwise transmission in a ring subnet, and transmission to another control module. When a node module (which may be the primary node module or the secondary node module) in the node device 02 transmits a signal, there may also be three transmission directions: clockwise transmission in a ring subnet, counterclockwise transmission in a ring subnet, and transmission to another node module. A transmission direction in which the control module and the node module actually transmit signals may be controlled by the primary control module in the primary controller 01. Alternatively, in a scenario in which the node device 02 is the secondary controller, a transmission direction in which the node module transmits a signal may be determined by the node module based on a fault situation detected by the node module. For example, when detecting that an interface of the node module is faulty or a signal cable connected to an interface is faulty, the node module may turn off the interface, for example, may set the interface to an inactive (down) state, and transmit a signal through another interface.

In this embodiment of this application, the at least one sensor 03 included in the control system may be classified into a first-type sensor and a second-type sensor. A function safety integrity level of the first-type sensor may be higher than a function safety integrity level of the second-type sensor. The first-type sensor may be separately connected to the primary control module and the secondary control module in the primary controller 01, or may be separately connected to the primary node module and the secondary node module in the node device 02. The second-type sensor may be connected to one of the primary control module, the secondary control module, the primary node module, and the secondary node module.

In other words, the first-type sensor with a higher function safety integrity level may be connected to both control modules in the primary controller 01, or connected to both node modules in the node device 02. However, the second-type sensor with a lower function safety integrity level may be connected to only one module in the primary controller 01 or the node device 02.

Similarly, the at least one executor 04 may include a first-type executor and a second-type executor. A function safety integrity level of the first-type executor is higher than a function safety integrity level of the second-type executor. The first-type executor may be separately connected to the primary control module and the secondary control module, or separately connected to the primary node module and the secondary node module. The second-type executor may be connected to one of the primary control module, the secondary control module, the primary node module, and the secondary node module.

In other words, the first-type executor with a higher function safety integrity level may be connected to both control modules in the primary controller 01, or connected to both node modules in the node device 02. The second-type executor with a lower function safety integrity level may be connected to only one module in the primary controller 01 or the node device 02.

For example, for a vehicle control system, the first-type sensor may include a speed sensor, a brake sensor, a steering sensor, an image sensor, an airbag sensor, and the like, and the second-type sensor may include a temperature sensor, and the like. The first-type executor may include a braking system motor, a steering system motor, and the like, and the second-type executor may include a window lifting motor, a drive circuit of a sound box, and the like.

According to the solution provided in this embodiment of this application, a device with a higher function safety integrity level is connected to both control modules of the primary controller 01, or is connected to both node modules of the node device 02. This can ensure reliability of data collection and instruction execution, thereby improving security of the control system. However, for a device with a lower function safety integrity level, the device is connected to only one module in the primary controller 01 or the node device 02. This can simplify an architecture of the control system and reduce system complexity.

Optionally, refer to FIG. 9 and FIG. 15. The control system may further include a first power supply A0(A) and a second power supply A0(B). The first power supply A0(A) may be separately connected to the primary control module in the primary controller 01 and the primary node module in the at least one node device 02, and is configured to supply power to the primary control module and the primary node module in the at least one node device 02. The second power supply A0(B) may be separately connected to the secondary control module in the primary controller 01 and the secondary node module in the at least one node device 02, and is configured to supply power to the secondary control module and the secondary node module in the at least one node device 02.

The redundant second power supply A0(B) is disposed to supply power to the secondary control module and the secondary node module. This can ensure that two ring subnets in the control system can operate independently, and further ensure function safety and reliability of the control system.

It should be understood that, in addition to supplying power to the primary control module and the primary node module, the first power supply A0(A) may further supply power to other devices (such as a sensor and an executor) connected to the primary control module and another device connected to the primary node module. Similarly, the second power supply A0(B) may also supply power to another device connected to the secondary control module and another device connected to the secondary node module.

As shown in FIG. 9, FIG. 12, FIG. 14, and FIG. 15, the control system provided in this embodiment of this application may further include a gateway W0. The gateway W0 is connected to the primary controller 01 or the at least one node device 02. For example, refer to FIG. 9, FIG. 12, FIG. 14, and FIG. 15. The gateway W0 may be connected to the primary controller E5.

The gateway W0 may be configured to: send, to an external device, data from the primary controller 01 or the at least one node device 02 connected to the gateway W0, and send, to the primary controller 01 or the at least one node device 02 connected to the gateway W0, data from the external device. In other words, the gateway W0 may be configured to exchange data between the external device and the primary controller 01, or between the external device and the at least one node device 02. The external device may be a device independent of the control system. For example, for a vehicle control system, the external device may include a mobile terminal such as a mobile phone, a communication base station, a roadside data base station, another vehicle, and the like.

In the control system provided in this embodiment of this application, the primary controller 01 or the at least one node device 02 may further communicate with the external device by using the gateway. This enriches functions of the control system, and improves flexibility of the control system during operation.

Optionally, refer to FIG. 9, FIG. 12, FIG. 14, and FIG. 15. It can be learned that the gateway W0 may also include a primary communication module W0(A) and a secondary communication module W0(B) connected to the primary communication module W0(A). The primary communication module W0(A) may be connected to the primary control module or the primary node module, and may establish a communication connection with the external device through a primary channel D0(A). The secondary communication module W0(B) may be connected to the secondary control module or the secondary node module, and may establish a communication connection with the external device through a secondary channel D0(B). In addition, as shown in FIG. 9, FIG. 12, FIG. 14, and FIG. 15, the primary communication module W0(A) may be connected to the first power supply A0(A) and powered by the first power supply A0(A). The secondary communication module W0(B) may be connected to the second power supply A0(B) and powered by the second power supply A0(B).

Two communication modules are designed, and the two communication modules are independently powered by different power supplies. This can ensure function safety and reliability when the primary controller 01 or the node device 02 exchanges data with the external device.

In this embodiment of this application, when data is exchanged between two devices in the ring network (for example, between the primary controller and the node device, or between different node devices), and a device in the ring network exchanges data with the external device, a sender of the data may add a timestamp to the data based on coordinated universal time (UTC). In this way, it can be ensured that a receiver of the data can reassemble a data time sequence based on the timestamp, to check the data time sequence. In addition, adding a timestamp can further enable the receiver to determine a transmission delay of the data to perform delay correction, thereby ensuring that the receiver has good automatic control performance for the received data.

Optionally, in this embodiment of this application, each of the first router and the second router may include a primary routing module and a redundant secondary routing module connected to the primary routing module. Functions of the primary routing module and the secondary routing module may be the same, and each of the primary routing module and the secondary routing module may be a chip with a forwarding function. A primary routing module in the first router may be connected to a primary routing module in the second router, and may be connected to the primary control module in the primary controller 01 or the primary node module in the node device 02. A secondary routing module in the first router may be connected to a secondary routing module in the second router, and may be connected to the secondary control module in the primary controller 01 or the secondary node module in the node device 02.

Figure 16:
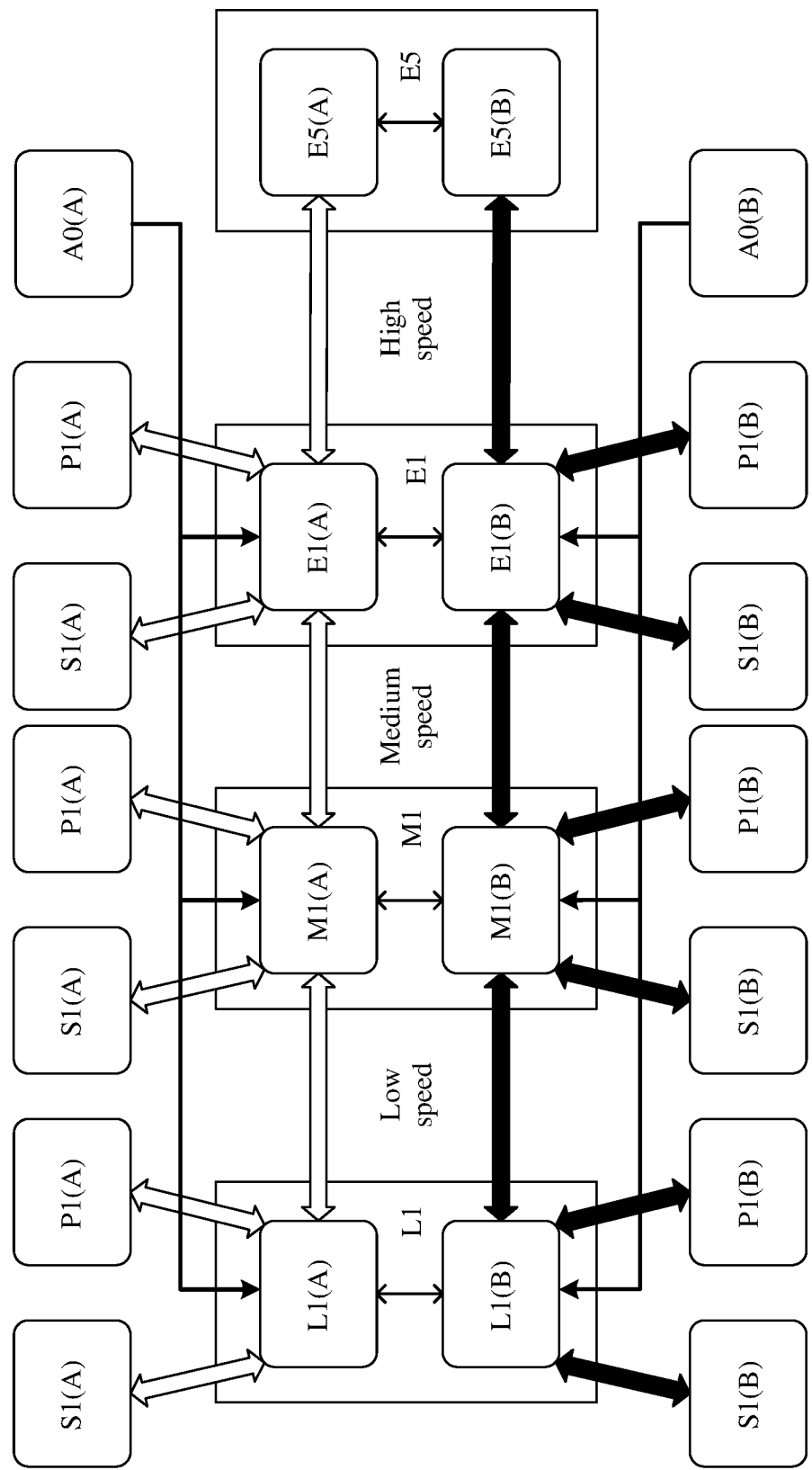
FIG. 16 is a schematic diagram of a local structure of a control system according to an embodiment of this application.

For example, refer to FIG. 16. A first router M1 in the control system includes a primary routing module M1(A) and a secondary routing module M1(B), and a second router L1 includes a primary routing module L1(A) and a secondary routing module L1(B). The primary routing module M1(A) is separately connected to a primary node module E1(A) of a secondary controller E1 and the primary routing module L1(A) in the second router L1. The secondary routing module M1(B) is separately connected to a secondary node module E1(B) of the secondary controller E1 and the secondary routing module L1(B) in the second router L1.

In addition, with reference to FIG. 16, it can be further learned that both the primary routing module and the secondary routing module in the router may be powered by independent power supplies. For example, the primary routing modules are all connected to the first power supply A0(A), and powered by the first power supply A0(A). The secondary routing modules are all connected to the second power supply A0(B), and powered by the second power supply A0(B).

In a scenario in which a router in the control system includes a primary routing module and a secondary routing module, the primary control module in the primary controller 01 or the primary node module in the node device 02 may send a reference clock signal to the primary routing module. The primary routing module may further send the received reference clock signal to the secondary routing module. Alternatively, the secondary control module in the primary controller 01 or the secondary node module in the node device 02 may send a reference clock signal to the secondary routing module.

Figure 17:
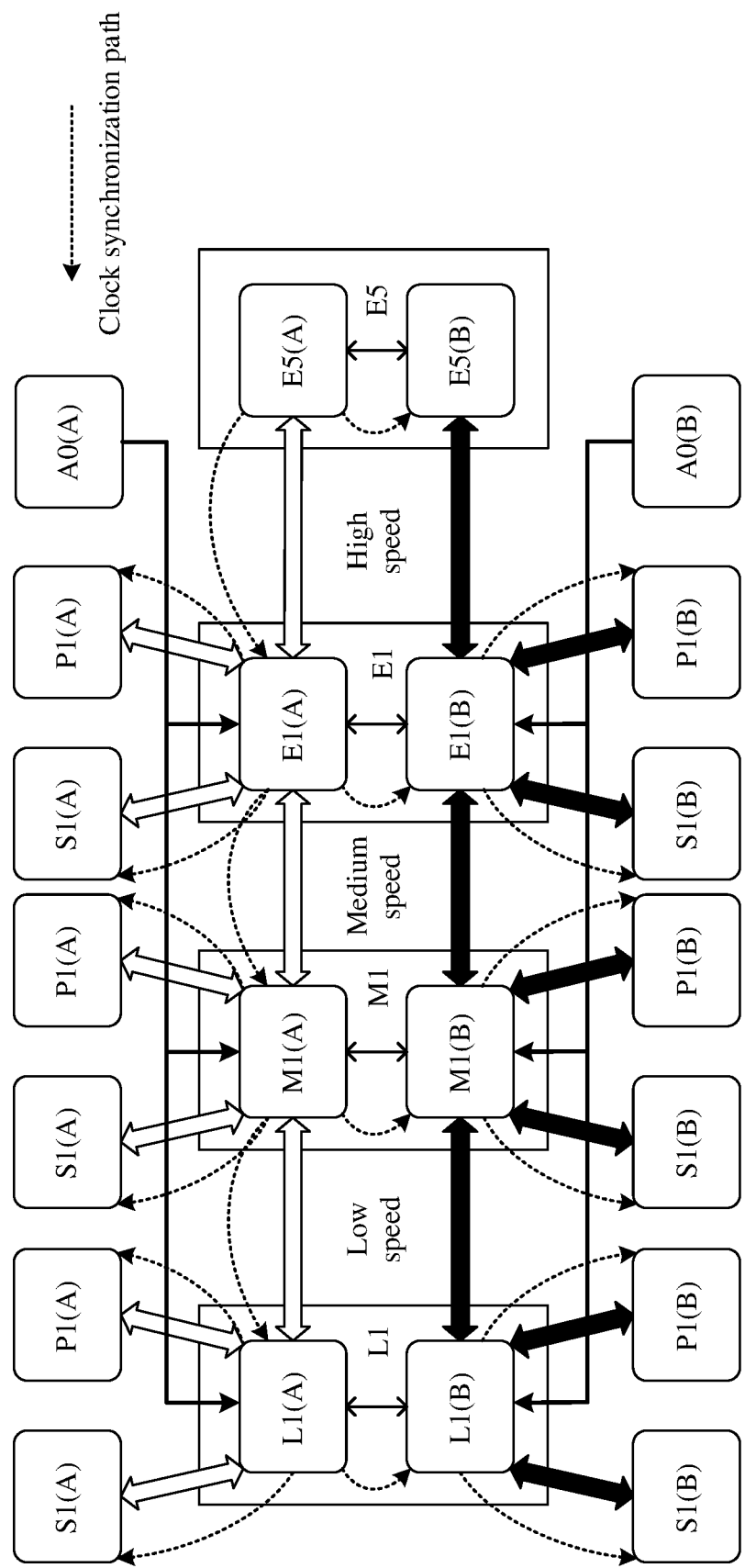
FIG. 17 is a schematic diagram of another clock synchronization path according to an embodiment of this application.

FIG. 17 is a schematic diagram of another clock synchronization path in a control system according to an embodiment of this application. Refer to FIG. 17. It can be learned that a primary control module E5(A) in a primary controller E5 may send a reference clock signal to a primary routing module E1(A) in a first router E1 to implement clock synchronization. Further, the primary routing module E1(A) in the first router E1 may separately send the reference clock signal to a secondary routing module E1(B) and a primary routing module M1(A) in a second router M1, to implement clock synchronization. Finally, the primary routing module M1(A) in the second router M1 may send the reference clock signal to a secondary routing module M1(B), to implement clock synchronization.

In this embodiment of this application, a first-type sensor with a high safety level may be connected to both routing modules in the router, and a second-type sensor with a low safety level may be connected to only one routing module in the router. Similarly, a first-type executor with a high safety level may be connected to both routing modules in the router, and a second-type executor with a low safety level may be connected to only one routing module in the router.

For example, refer to FIG. 16. A first-type sensor S1 may include a primary sensor module S1(A) and a secondary sensor module S1(B). The primary sensor module S1(A) may be connected to a primary routing module, a primary control module, or a primary node module. The secondary sensor module S1(B) may be connected to a secondary routing module, a secondary control module, or a secondary node module. A first-type executor P1 may include a primary execution module P1(A) and a secondary execution module P1(B). The primary execution module P1(A) may be connected to a primary routing module, a primary control module, or a primary node module. The secondary execution module P1(B) may be connected to a secondary routing module, a secondary control module, or a secondary node module.

In the control system provided in this embodiment of this application, both the controller and the router have redundant function modules and redundant signal links, and may be powered by redundant power supplies. Therefore, function safety and reliability of the control system are effectively improved.

Optionally, a quantity of controllers included in the control system provided in this embodiment of this application may be flexibly adjusted based on a requirement of an application scenario. For example, the quantity of controllers included in the control system may be comprehensively determined based on factors such as controller performance, a communication rate requirement of a ring network, a quantity of sensors and executors included in the control system, function complexity, and costs. An onboard control system is used as an example. Refer to FIG. 9, FIG. 12, and FIG. 15. The onboard control system may include five controllers in total: E1 to E5, where E5 is a primary controller, and E1 to E4 are secondary controllers. In addition, based on a setting orientation of each secondary controller, the secondary controller E1 may also be referred to as a front-left controller, the secondary controller E2 may also be referred to as a rear-left controller, the secondary controller E3 may also be referred to as a rear-right controller, and the secondary controller E4 may also be referred to as a front-right controller.

Figure 18:
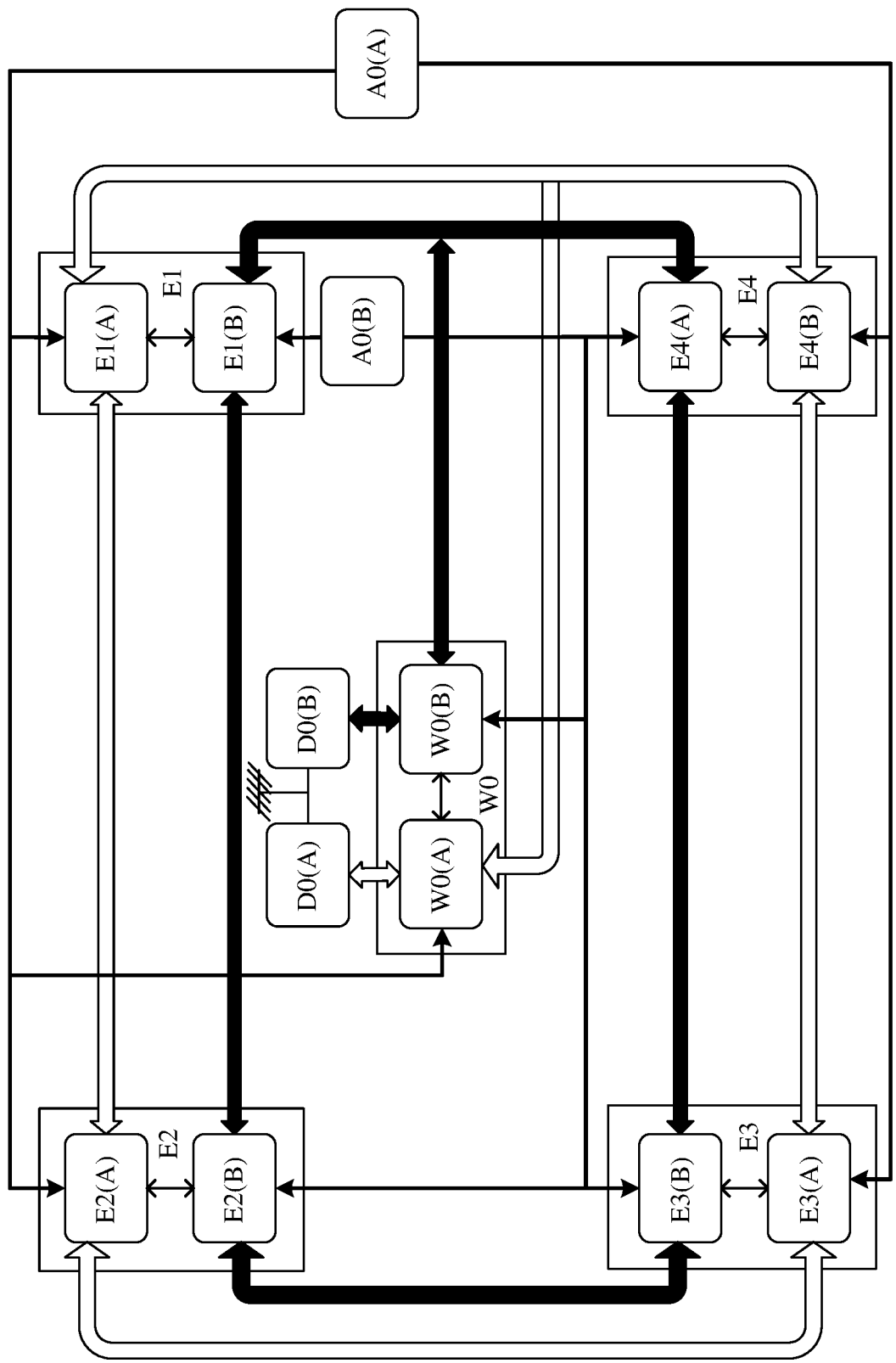
FIG. 18 is a schematic diagram of a structure of yet another control system according to an embodiment of this application.
Figure 19:
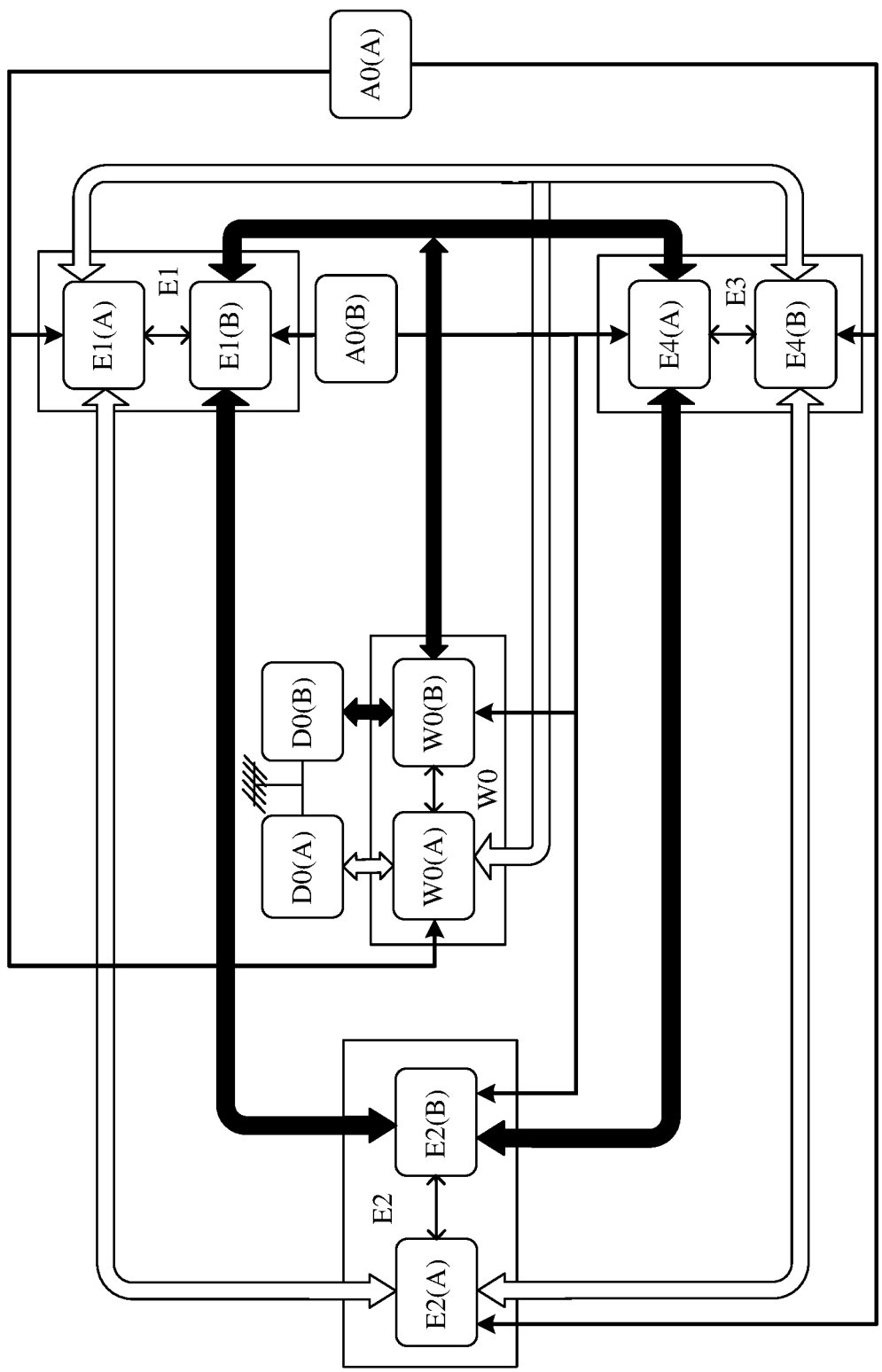
FIG. 19 is a schematic diagram of a structure of yet another control system according to an embodiment of this application.
Figure 20:
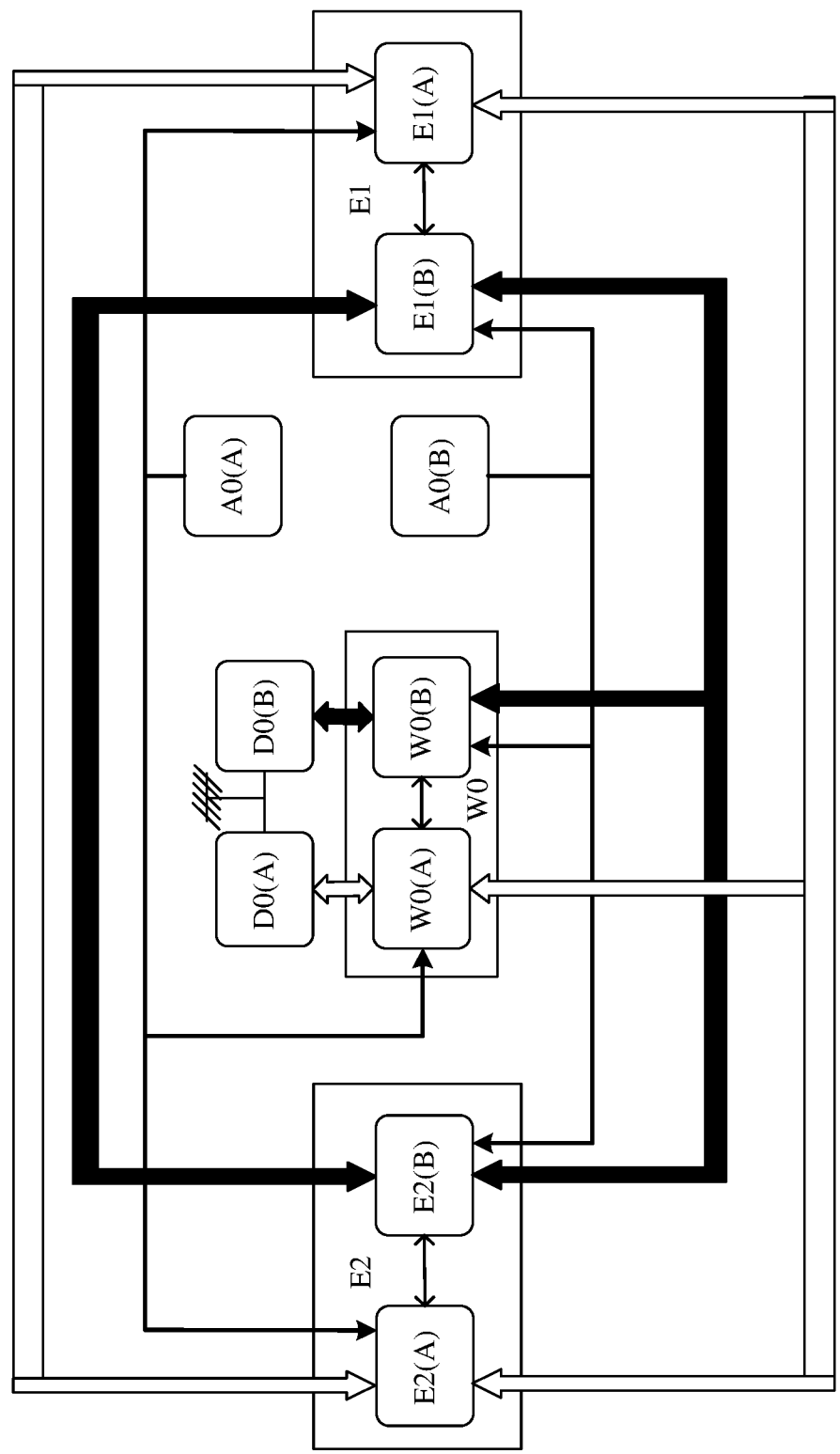
FIG. 20 is a schematic diagram of a structure of yet another control system according to an embodiment of this application.

Alternatively, refer to FIG. 18. The control system may include four controllers in total: E1 to E4, where one of the four controllers is a primary controller, and the other three controllers are secondary controllers. Alternatively, refer to FIG. 19. The control system may include three controllers in total: E1 to E3, where E1 is a front-left controller, E2 is a rear controller, and E3 is a front-right controller. In addition, one of the three controllers is a primary controller, and the other two controllers are secondary controllers. Alternatively, refer to FIG. 20. The control system may include two controllers: E1 and E2, where E1 is a front controller, and E2 is a rear controller. In addition, one of the two controllers is a primary controller, and the other is a secondary controller.

It can be understood that, in addition to being a vehicle control system, the control system provided in this embodiment of this application may be another type of control system. For example, the control system may be a system that has a high requirement on real-time control or a control system that has a high requirement on function safety. The system that has a high requirement on real-time control may include: an aircraft power system, a steering system, a telex system, an industrial control servo system, a cyclotron, an electromagnetic ejection system, an electromagnetic gun system, and the like. The system that has a high requirement on function safety includes: a surgical robot control system in a medical field, a remote control system, and a rail transport drive system, and may further include a drive and control system of an autonomous vehicle, a teleoperated driving vehicle, and an airborne vehicle. In addition, the control system provided in this embodiment of this application may be further applied to an automation industry field that has a high requirement on security. For example, the control system may be a remote or remote control system for a chemical industry, nuclear energy, a coal mine, or a wharf, or may be a fault locating and ranging system for an electric power industry.

The control system provided in this embodiment of this application further has the following functions and beneficial effects:

1. All software functions are moved up to the controller in the ring network to implement software and hardware decoupling, enhance flexibility of the control system, reduce test complexity of sensors and executors, ensure test quality, reduce joint commissioning time of the control system, and reduce development difficulty.
2. A transmission direction of a signal (namely, communication route) can be dynamically adjusted based on a fault situation. In addition, an execution moment of a task, a physical carrier (for example, a primary controller or a secondary controller) on which a software module runs and a function of each software module all may be dynamically scheduled by the primary controller, to improve reliability and application flexibility of the control system.
3. For a vehicle control system, based on clock synchronization and task scheduling functions of the primary controller at a vehicle system level, implementations of conventional ECU functions such as sensor control and executor control may be converted into an implementation of a controller, to effectively reduce a quantity of ECUs in the vehicle and reduce ECU and harness costs of the vehicle.
4. A high-level function safety algorithm (for example, a microsecond fast function safety protection overcurrent), detection of a latent fault can be implemented by a controller at a top layer. A top layer function safety check and a model check can effectively enhance security of the entire control system and reduce hardware and software overhead costs caused by a bottom layer function safety mechanism.

5. Each device in the control system adopts a redundant structure. This can degrade a function safety integrity level at a system level. For example, for a vehicle control system, an automotive safety integration level (ASIL) may be degraded from a level D to a level B or below.

6. EMC performance of the entire control system is improved through frequency modulation of the reference clock signal.

7. The primary controller schedules tasks in a unified manner, to avoid a problem such as resource preemption and competition that occurs in tasks in the control system and ensure orderly execution of the tasks.

8. The primary/secondary controller is dynamically adjusted based on a running state detection mechanism and a fault detection mechanism for a plurality of controllers in the ring network. An adjustment principle includes a priority and a fault state of a controller.

9. Operations of related registers in the control system are synchronously performed based on a frequency of a reference clock signal. In addition, in the primary controller, codes used to implement different tasks are stored in different regions, and are independent of each other in time sequence and do not interfere with each other.

In conclusion, the embodiment of this application provides the control system. The primary controller in the control system may directly send the reference clock signal to the at least one node device by using the ring network, so that the at least one node device can perform timing based on the frequency of the reference clock signal. In this way, clock synchronization between the primary controller and the at least one node device is implemented. Compared with sending of a data frame, direct sending of the reference clock signal may improve precision of the clock synchronization between the primary controller and the at least one node device to precision equal to a pulse width of the reference clock signal, thereby effectively improving precision of clock synchronization. In addition, because the primary controller and the at least one node device in the control system can be sequentially connected to form a ring network, it can be ensured that there are redundant signal exchange paths during signal exchange between the primary controller and the at least one node device, thereby ensuring reliability of signal transmission.

In addition, in the control system provided in this embodiment of this application, precision of time synchronization between the primary controller and the at least one node device is high. Therefore, it can be ensured that all time sensitive tasks can be moved up by an ECU to the primary controller or the node device for execution, thereby effectively reducing a quantity of ECUs in the control system, and simplifying a function of the ECU (for example, the ECU can be simplified as a router). The control system has lower complexity and higher flexibility.

Figure 21:
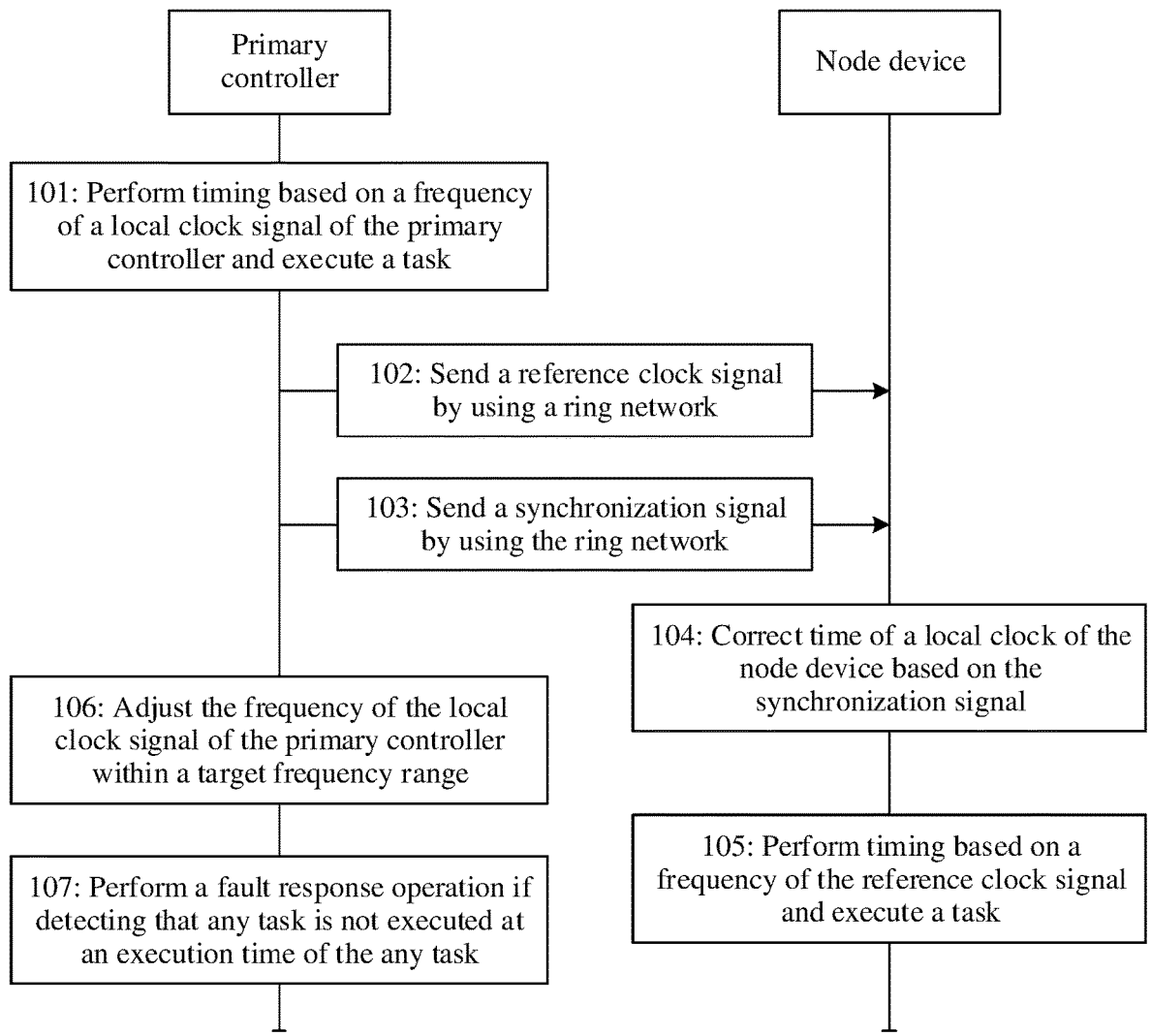
FIG. 21 is a flowchart of a clock synchronization method according to an embodiment of this application.

An embodiment of this application further provides a clock synchronization method. The clock synchronization method may be applied to the control system provided in the foregoing embodiment. Refer to FIG. 21. The method may include the following steps.

Step 101: A primary controller performs timing based on a frequency of a local clock signal of the primary controller and executes a task.

The local clock signal of the primary controller may be generated after a PLL in the primary controller performs, based on a preset frequency multiplication value, frequency multiplication on a source clock signal generated by a crystal oscillator in the primary controller.

The task executed by the primary controller may include one or more of the following tasks: a data transmission task, a data processing task, a sending task of an instruction, and an output task of a drive signal. The instruction may be used to instruct a sensor to collect data, or used to instruct to output the drive signal to an executor.

Step 102: The primary controller sends a reference clock signal to at least one node device by using a ring network.

The reference clock signal is obtained based on the local clock signal of the primary controller, and the reference clock signal is used by the at least one node device to perform timing based on a frequency of the reference clock signal and execute a task. The reference clock signal is the local clock signal of the primary controller. Alternatively, the reference clock signal is a clock signal obtained by performing frequency division on the local clock signal of the primary controller.

Optionally, the primary controller may include a primary control module and a secondary control module connected to the primary control module. The at least one node device may include a primary node module and a secondary node module connected to the primary node module. The ring network includes a first ring subnet and a second ring subnet. The first ring subnet includes the primary control module and the primary node module in the at least one node device, and the second ring subnet includes the secondary control module and the secondary node module in the at least one node device. In a scenario in which the primary controller includes two control modules, the reference clock signal may be obtained based on a local clock signal of the primary control module.

Correspondingly, in step 102, the primary control module may separately send the reference clock signal to the secondary control module and the primary node module in the at least one node device.

Then, the primary node module in the node device may send the received reference clock signal to the secondary node module connected to the primary node module. Alternatively, the secondary control module in the primary controller may send the reference clock signal to the secondary node module in the at least one node device by using the second ring subnet.

Step 103: The primary controller sends a synchronization signal to the at least one node device by using the ring network.

The synchronization signal is used by the at least one node device to correct time of a local clock of the node device.

In an optional implementation, the primary controller is connected to the at least one node device by using a clock signal cable. In this implementation, the primary controller may send a compound signal of the reference clock signal and the synchronization signal to the at least one node device by using the clock signal cable.

In another optional implementation, the primary controller is connected to the at least one node device by using a clock signal cable and a synchronization signal cable. In this implementation, the primary controller may send a reference clock signal to the at least one node device by using the clock signal cable, and may send a synchronization signal to the at least one node device by using the synchronization signal cable.

Step 104: The node device corrects the time of the local clock of the node device based on the synchronization signal.

After receiving the synchronization signal, the node device may correct the time of the local clock of the node device based on the synchronization signal, to ensure time synchronization with the primary controller.

In a scenario in which the primary controller sends a compound signal of the reference clock signal and the synchronization signal by using the clock signal cable, the node device may separately obtain the synchronization signal and the reference clock signal from the received compound signal based on an amplitude and/or a pulse width of the received compound signal.

In a scenario in which the primary controller sends a reference clock signal by using the clock signal cable and sends a synchronization signal by using the synchronization signal cable, the node device may receive, by using the clock signal cable, the reference clock signal sent by the primary controller, and may receive, by using the synchronization signal cable, the synchronization signal sent by the primary controller. In other words, the node device does not need to parse the synchronization signal and the reference clock signal from the compound signal. This reduces complexity of receiving the synchronization signal and the reference clock signal by the node device.

Step 105: The node device performs timing based on the frequency of the reference clock signal and executes a task.

In an optional implementation, the node device may include a PLL. The node device may correct a frequency of a local clock signal of the node device based on the frequency of the reference clock signal by using the PLL, to maintain a target ratio between the frequency of the local clock signal of the node device and the frequency of the reference clock signal. Then, the node device may perform timing based on a frequency of a corrected local clock signal of the node device and execute the task.

In another optional implementation, the node device may directly perform timing based on the frequency of the reference clock signal and execute the task. In other words, the node device may not need to correct the frequency of the local clock signal of the node device.

Step 106: The primary controller adjusts the frequency of the local clock signal of the primary controller within a target frequency range.

In this embodiment of this application, the primary controller may further perform frequency modulation on the local clock signal of the primary controller, so that EMC performance of a frequency sensitive circuit in the control system in a task execution process can be effectively improved.

Step 107: The primary controller performs a fault response operation if detecting that any task is not executed at an execution moment of the any task.

The primary controller may further monitor an execution situation of a task in the control system. If detecting that any task is not executed at an execution moment of the any task, the primary controller may perform a fault response operation. The fault response operation may include one or more of the following operations:

restarting a device for executing the any task, where the device is the primary controller or the at least one node device;

restarting a sensor and/or an executor connected to the device for executing the any task; and executing a security task configured in the primary controller.

Optionally, the at least one node device in the control system may be at least one secondary controller. The control system may further include at least one sensor and at least one executor. The at least one sensor is connected to the primary controller or the at least one secondary controller, and the at least one executor is connected to the primary controller or the at least one secondary controller. A task that needs to be executed by the primary controller and a task that needs to be executed by the at least one secondary controller each include one or more of the following tasks: a data transmission task, a data processing task, a sending task of an instruction, and an output task of a drive signal. The instruction is used to instruct the at least one sensor to collect data, or is used to instruct to output the drive signal to the at least one executor.

Figure 22:
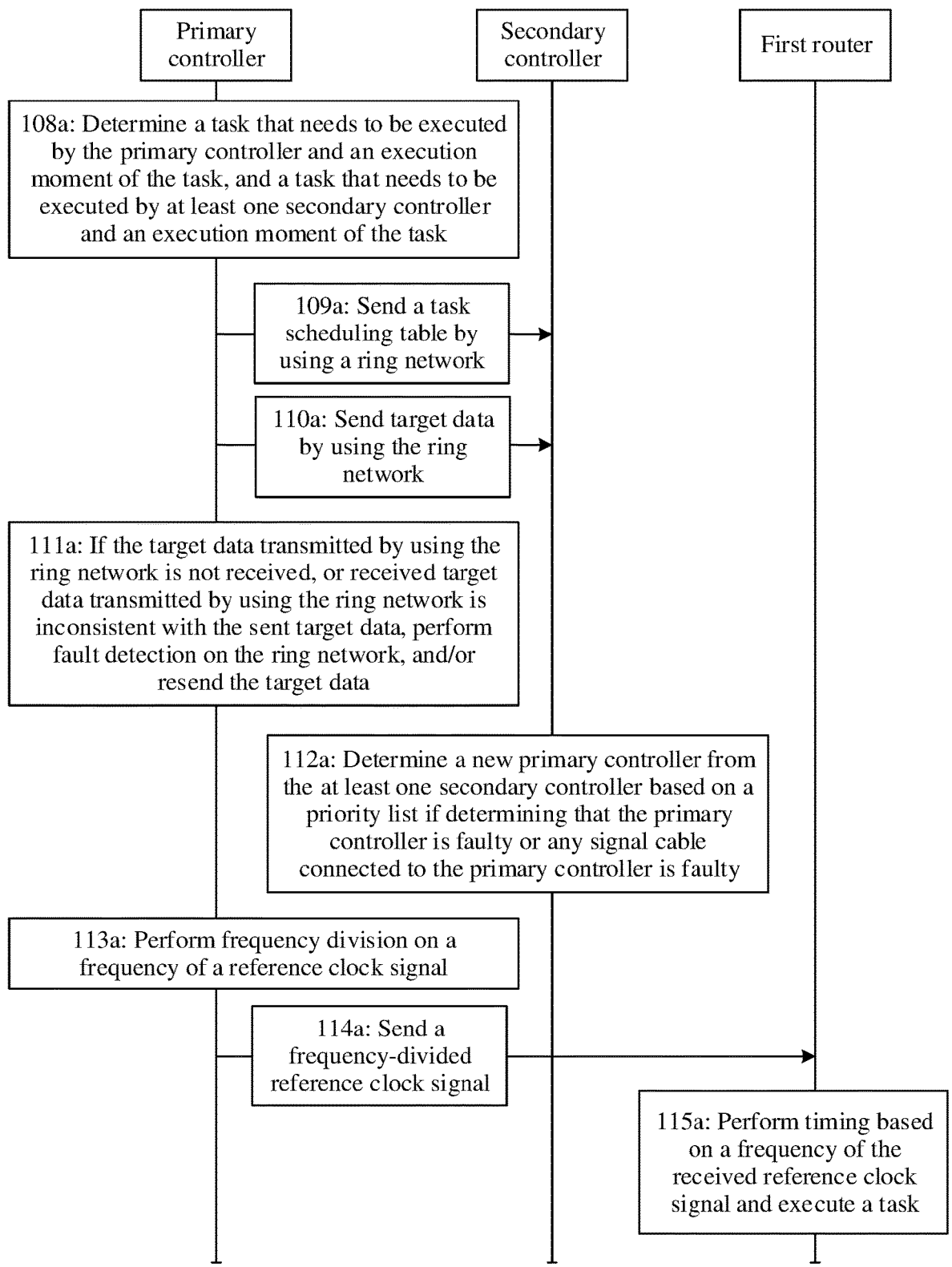
FIG. 22 is a flowchart of another clock synchronization method according to an embodiment of this application.

Refer to FIG. 22. In a scenario in which the at least one node device is the at least one secondary controller, the method may further include the following steps.

Step 108a: The primary controller determines a task that needs to be executed by the primary controller and an execution moment of the task, and a task that needs to be executed by the at least one secondary controller and an execution moment of the task.

In this embodiment of this application, the primary controller may determine tasks that need to be executed by a plurality of controllers (including the primary controller and the secondary controller) in the ring network and execution moments of the tasks. In other words, the primary controller may implement unified scheduling and management of tasks, to ensure orderly execution of the tasks.

If a to-be-executed task includes a general data processing task, and the general data processing task requires a large quantity of computing resources, the primary controller may divide the general data processing task into a plurality of data processing tasks. In addition, the primary controller determines, based on load of the primary controller and load of the at least one secondary controller, a data processing task that needs to be executed by the primary controller and a data processing task that needs to be executed by the at least one secondary controller. This can implement distributed execution of data processing tasks, and can further improve utilization of computing resources of the controller on the basis of improvement of task execution efficiency.

Step 109a: The primary controller sends a task scheduling table to the at least one secondary controller.

The task scheduling table may include the task that needs to be executed by the at least one secondary controller and the execution moment of the task. After receiving, by using the ring network, the task scheduling table sent by the primary controller, the secondary controller may execute the task based on the execution moment of the task recorded in the task scheduling table. In other words, in step 105, the secondary controller may perform timing based on the frequency of the reference clock signal, and execute the task at the execution moment of the task that needs to be executed by the secondary controller.

Similarly, in step 101, the primary controller may perform timing based on the frequency of the local clock signal of the primary controller, and execute the task at the execution moment of the task that needs to be executed by the primary controller.

Step 110a: The primary controller sends target data to the at least one secondary controller by using the ring network.

The target data may be data that has a high requirement on security and that needs to be shared by a plurality of controllers included in the ring network. For example, the target data may include a vehicle speed.

Step 111a: If the target data transmitted by using the ring network is not received, or received target data transmitted by using the ring network is inconsistent with the sent target data, the primary controller performs fault detection on the ring network, and/or resends the target data.

In this embodiment of this application, after sending, by using the ring network, the target data that has a high security requirement, the primary controller may detect whether the secondary controller in the ring network correctly receives the target data. In this way, it can be ensured that the target data can be reliably transmitted to the secondary controller.

It should be understood that the secondary controller in the control system may also perform the method shown in step 110a and step 111a. In other words, the secondary controller may also send the target data by using the ring network, and may perform fault detection on the ring network, and/or resend the target data when detecting that another controller in the ring network does not correctly receive the target data.

Step 112a: If the secondary controller determines that the primary controller is faulty or any signal cable connected to the primary controller is faulty, the secondary controller determines a new primary controller from the at least one secondary controller based on a priority list.

The secondary controller may further store a priority list, and the priority list includes a priority of the at least one secondary controller included in the control system. If the secondary controller determines that the primary controller is faulty or any signal cable connected to the primary controller is faulty, the secondary controller may determine, based on the priority list, a new primary controller from the at least one secondary controller included in the control system. Then, the new primary controller may perform unified scheduling management on a plurality of controllers in the control system, to be specific, a primary control right of the control system may be handed over to the new primary controller, to ensure that the control system can still properly run.

Optionally, the control system may further include at least one first router. A first port of the at least one first router is connected to the primary controller, and a second port of the at least one first router is connected to the at least one sensor and/or the at least one executor. A data transmission rate of the first port is lower than a data transmission rate of the ring network, and a data transmission rate of the second port is lower than the data transmission rate of the first port. Still refer to FIG. 22. The method may further include the following steps.

Step 113a: The primary controller performs frequency division on the frequency of the reference clock signal.

The primary controller may perform frequency division on the frequency of the reference clock signal based on a preset frequency division value.

Step 114a: The primary controller sends a frequency-divided reference clock signal to the at least one first router.

Step 115a: The first router performs timing based on a frequency of the received reference clock signal and executes a task.

After receiving the frequency-divided reference clock signal sent by the primary controller, the first router may perform timing based on the frequency of the frequency-divided reference clock signal and execute the task.

It should be understood that the secondary controller in the control system may also be connected to the first port of the first router. If the secondary controller is also connected to the first router, the secondary controller may also perform the method shown in step 113a and step 114a. In other words, the secondary controller may perform frequency division on the frequency of the reference clock signal sent by the primary controller, and send the frequency-divided reference clock signal to the first router connected to the secondary controller.

In a scenario in which the at least one node device is the at least one first router, the at least one sensor in the control system may be connected to the primary controller or the first router, and the at least one executor in the control system may be connected to the primary controller or the first router. A task that needs to be executed by the primary controller includes one or more of the following tasks: a data transmission task, a data processing task, a sending task of an instruction, and an output task of a drive signal. A task that needs to be executed by the first router includes one or more of the following tasks: a data transmission task, a sending task of an instruction, and an output task of a drive signal. The instruction is used to instruct the at least one sensor to collect data, or is used to instruct to output the drive signal to the at least one executor.

The first port of the first router is connected to the primary controller. The control system may further include at least one second router. A third port of the at least one second router is connected to the second port of the first router, and a fourth port of the at least one second router is connected to the at least one sensor and/or the at least one executor. The data transmission rate of the first port is equal to the data transmission rate of the ring network, the data transmission rate of the second port is lower than the data transmission rate of the first port, a data transmission rate of the third port is equal to the data transmission rate of the second port, and a data transmission rate of the fourth port is lower than the data transmission rate of the third port.

Figure 23:
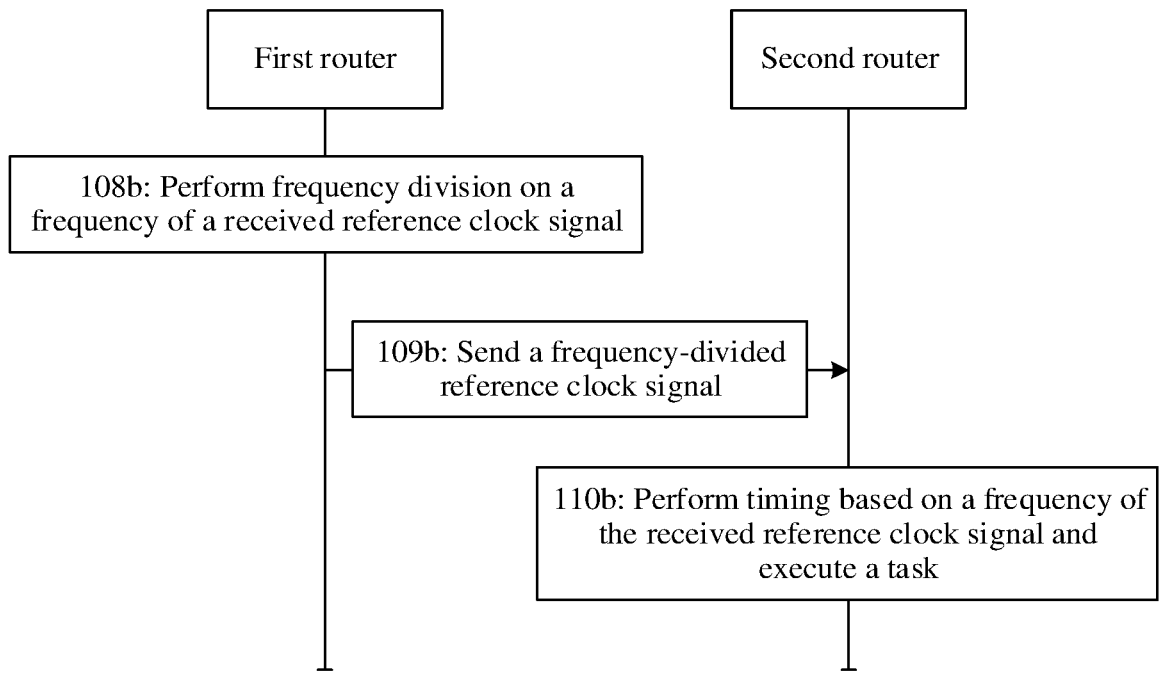
FIG. 23 is a flowchart of still another clock synchronization method according to an embodiment of this application.

In a scenario in which the at least one node device is the at least one first router, as shown in FIG. 23, the clock synchronization method may further include the following steps.

Step 108b: The first router performs frequency division on a frequency of a received reference clock signal.

After receiving the reference clock signal sent by the primary controller, the first router may perform frequency division on the frequency of the reference clock signal based on a preset frequency division value.

Step 109b: The first router sends a frequency-divided reference clock signal to the at least one second router.

Step 110b: The second router performs timing based on a frequency of the received reference clock signal and executes a task.

After receiving the frequency-divided reference clock signal sent by the first router, the second router may perform timing based on the frequency of the frequency-divided reference clock signal and execute the task.

It should be understood that a sequence of steps in the clock synchronization method provided in this embodiment of this application may be properly adjusted, or steps may be correspondingly added or deleted based on a situation. For example, in the embodiment shown in FIG. 21, step 103 may be performed before step 102, step 106 may be performed before step 103, and step 107 may be performed before step 106. Alternatively, step 103 and step 104 may be deleted based on a situation, and step 106 and step 107 may also be deleted based on a situation. In the embodiment shown in FIG. 22, step 110a and step 111a may be deleted based on a situation, step 112a may be deleted based on a situation, and step 113a to step 115a may also be deleted based on a situation. In addition, in the embodiment shown in FIG. 22, the first router may also perform the method shown in step 108b and step 109b in the embodiment shown in FIG. 23.

In conclusion, the embodiment of this application provides the clock synchronization method. The primary controller may directly send the reference clock signal to the at least one node device by using the ring network, so that the at least one node device can perform timing based on the frequency of the reference clock signal. In this way, clock synchronization between the primary controller and the at least one node device is implemented. Compared with sending of a data frame, direct sending of the reference clock signal may improve precision of clock synchronization between the primary controller and the at least one node device to precision equal to a pulse width of the reference clock signal, thereby effectively improving precision of clock synchronization.

It can be clearly understood by a person skilled in the art that, for a purpose of convenient and brief description, for a specific operation process of the clock synchronization method described above, reference may be made to the related description in the foregoing system embodiment, and details are not described herein again.

An embodiment of this application further provides a primary controller. The primary controller may be applied to the control systems provided in the foregoing embodiments. The primary controller may include a programmable logic circuit and/or program instructions, and the primary controller is configured to implement the steps performed by the primary controller in the foregoing method embodiment.

Figure 24:
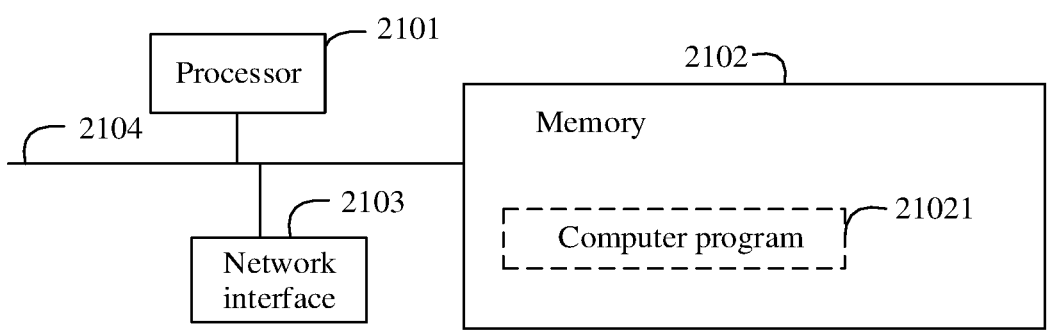
FIG. 24 is a schematic diagram of a structure of a primary controller according to an embodiment of this application.

FIG. 24 is a schematic diagram of a structure of a primary controller according to an embodiment of this application. Refer to FIG. 24. The primary controller may include a processor 2101, a memory 2102, a network interface 2103, and a bus 2104. The bus 2104 is configured to connect the processor 2101, the memory 2102, and the network interface 2103. A communication connection to another device may be implemented through the network interface 2103 (which may be wired or wireless). The memory 2102 stores a computer program 21021. The computer program 21021 is used to implement various application functions.

It should be understood that in this embodiment of this application, the processor 2101 may be a CPU, or the processor 2101 may be another general-purpose processor, a digital signal processor (DSP), an application-specific integrated circuit (ASIC), a field programmable gate array (FPGA), a GPU or another programmable logic device, a discrete gate or transistor logic device, a discrete hardware assembly, or the like. The general-purpose processor may be a microprocessor, any conventional processor, or the like.

The memory 2102 may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and used as an external cache. Through an example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 2104 may further include a power bus, a control bus, a state signal bus, and the like. However, for clarity of description, various buses are marked as the bus 2104 in the figure.

The processor 2101 is configured to execute the computer program stored in the memory 2102, and the processor 2101 executes the computer program 21021 to implement the foregoing functions of the primary controller.

An embodiment of this application further provides a node device. The node device may be applied to the control system provided in the foregoing embodiment. The node device may include a programmable logic circuit and/or program instructions, and the node device may be configured to implement the steps performed by the node device in the foregoing method embodiment.

It should be understood that both the primary controller and the node device in the control system provided in this embodiment of this application may be implemented by using an application-specific integrated circuit (ASIC) or a programmable logic device (PLD). The PLD may be a complex programmable logic device (CPLD), a field-programmable gate array (FPGA), generic array logic (GAL), or any combination thereof. Certainly, functions of the primary controller and the secondary controller may also be implemented by using software. When the functions of the primary controller and the secondary controller are implemented by using the software, modules in the primary controller and the secondary controller may also be software modules.

An embodiment of this application further provides a vehicle. The vehicle may include the control system provided in the foregoing embodiment. For example, the vehicle may include the control system shown in any one of FIG. 1, FIG. 8, FIG. 9, and FIG. 12 to FIG. 20.

Optionally, the vehicle may be an electric vehicle. In addition, the vehicle may be an autonomous vehicle, a teleoperated driving vehicle, an airborne vehicle, or the like.

All or some of the foregoing embodiments may be implemented by using software, hardware, firmware, or any combination thereof. When software is used for implementation, all or some of the foregoing embodiments may be implemented in a form of a computer program product. The computer program product includes at least one computer instruction. When the computer program instruction is loaded or executed on a computer, all or some of the procedures or functions according to embodiments of this application are generated. The computer may be a general-purpose computer, a dedicated computer, a computer network, or another programmable apparatus. The computer instruction may be stored in a computer-readable storage medium, or transmitted from one computer-readable storage medium to another computer-readable storage medium, for example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, that includes at least one usable medium set. The usable medium may be a magnetic medium (for example, a floppy disk, a hard disk, or a magnetic tape), an optical medium (for example, a DVD), or a semiconductor medium. The semiconductor medium may be a solid state drive (solid state drive, SSD).

In this application, terms such as "first" and "second" are used to distinguish same items or similar items that have basically same effects and functions. It should be understood that there is no logical or time sequence dependency between "first", "second", and "$n^{th}$". A quantity and an execution sequence are not limited. It should also be understood that although the terms such as "first" and "second" are used in the following descriptions to describe various elements, these elements should not be limited by the terms. These terms are only used to distinguish one element from another element. For example, a first power supply may be referred to as a second power supply without departing from a scope of the various examples described, and similarly, the second power supply may be referred to as the first power supply. Both the first power supply and second power supply may be power supplies, and in some cases may be separate and different power supplies.

In this application, a term "at least one" means at least one, and a term "a plurality of" means two or more. Terms "system" and "network" may be used interchangeably in this specification. It should be understood that "and/or" mentioned in this specification indicates that three relationships may exist. For example, A and/or B may indicate that only A exists, both A and B exist, and only B exists. The character "/" generally indicates an "or" relationship between the associated objects.

The foregoing descriptions are only optional implementations of this application, but a protection scope of this application is not limited thereto. Any equivalent modification or replacement readily figured out by a person skilled in the art within a technical scope disclosed in this application shall fall within the protection scope of this application. Therefore, the protection scope of this application should be subject to the protection scope of the claims.

What is claimed is:

1. A control system, wherein:
the control system comprises a ring network, and the ring network comprises a primary controller and at least one node device;
the primary controller is configured to:
perform timing and execute a first task based on a frequency of a local clock signal of the primary controller; and
send a reference clock signal to the at least one node device by using the ring network, wherein the reference clock signal is obtained by performing frequency division on the local clock signal of the primary controller; and
the at least one node device is configured to perform timing and execute a second task based on a frequency of the reference clock signal.

2. The control system according to claim 1, wherein the at least one node device comprises a phase-locked loop, and the at least one node device is configured to:
correct a frequency of a local clock signal of the node device, based on the frequency of the reference clock signal by using the phase-locked loop, to maintain a target ratio between the frequency of the local clock signal of the node device and the frequency of the reference clock signal; and
perform timing based on the frequency of the local clock signal of the node device.

3. The control system according to claim 1, wherein the at least one node device is at least one secondary controller, the control system further comprises at least one sensor and at least one executor, the at least one sensor is connected to the primary controller or the at least one secondary controller, and the at least one executor is connected to the primary controller or the at least one secondary controller; and
wherein a task that needs to be executed by the primary controller and a task that needs to be executed by the at least one secondary controller each comprise one or more of a data transmission task, a data processing task, a sending task of an instruction, and an output task of a drive signal, and wherein the instruction is used to instruct the at least one sensor to collect data or to output the drive signal to the at least one executor.

4. The control system according to claim 3, wherein the primary controller is further configured to:
determine the task that needs to be executed by the primary controller and an execution moment of the task that needs to be executed by the primary controller;
determine the task that needs to be executed by the at least one secondary controller and an execution moment of the task that needs to be executed by the at least one secondary controller;
execute a task at the execution moment of the task that needs to be executed by the primary controller; and
send a task scheduling table to the at least one secondary controller, wherein the task scheduling table received by the at least one secondary controller comprises the task that needs to be executed by the at least one secondary controller and the execution moment of the task that needs to be executed by the at least one secondary controller; and
wherein the at least one secondary controller is configured to execute, based on the task scheduling table, a task at the execution moment of the task that needs to be executed by the at least one secondary controller.

5. The control system according to claim 3, wherein the primary controller is further configured to:
divide a general data processing task into a plurality of data processing tasks; and
determine, based on load of the primary controller and load of the at least one secondary controller, a data processing task that needs to be executed by the primary controller and a data processing task that needs to be executed by the at least one secondary controller.

6. The control system according to claim 3, wherein the at least one secondary controller further stores a priority list, the priority list comprises a priority of the at least one secondary controller, and the at least one secondary controller is further configured to:
if it is determined that the primary controller is faulty or any signal cable connected to the primary controller is faulty, determine a new primary controller from the at least one secondary controller based on the priority list.

7. The control system according to claim 3, wherein the primary controller and the at least one secondary controller are further configured to:

send target data to another controller in the control system by using the ring network; and if the target data transmitted by using the ring network is not received or received target data transmitted by using the ring network is inconsistent with the sent target data, perform at least one of fault detection on the ring network or resending the target data.

8. The control system according to claim 7, wherein the control system further comprises a gateway, the gateway is connected to the primary controller or the at least one node device, and the gateway is configured to:

send, to an external device, data from a device connected to the gateway; and send, to the device connected to the gateway, data from the external device, wherein the external device is a device independent of the control system.

9. The control system according to claim 1, wherein the at least one node device is configured to maintain a target ratio between a frequency of a local clock signal of the node device and the frequency of the reference clock signal.

10. A clock synchronization method, applied to a primary controller in a control system, wherein the control system comprises a ring network, the ring network comprises the primary controller and at least one node device, and the method comprises:

performing timing and executing a first task based on a frequency of a local clock signal of the primary controller; and sending a reference clock signal to the at least one node device by using the ring network, wherein the reference clock signal is obtained by performing frequency division on the local clock signal of the primary controller, and the reference clock signal is used by the at least one node device to perform timing and execute a second task based on a frequency of the reference clock signal.

11. The method according to claim 10, wherein the at least one node device is at least one secondary controller, the control system further comprises at least one sensor and at least one executor, the at least one sensor is connected to the primary controller or the at least one secondary controller, and the at least one executor is connected to the primary controller or the at least one secondary controller; and wherein a task that needs to be executed by the primary controller and a task that needs to be executed by the at least one secondary controller each comprise one or more of a data transmission task, a data processing task, a sending task of an instruction, and an output task of a drive signal, and wherein the instruction is used to instruct the at least one sensor to collect data or to output the drive signal to the at least one executor.

12. The method according to claim 10, wherein the method further comprises:

if it is detected that any task is not executed at an execution moment of the any task, performing a fault response operation, wherein the fault response operation comprises one or more of the following operations:

restarting a device for executing the any task, wherein the device is the primary controller or the at least one node device;

restarting at least one of a sensor or an executor connected to the device for executing the any task; and executing a security task configured in the primary controller.

13. A vehicle, wherein the vehicle comprises a control system, the control system comprises a ring network, and the ring network comprises a primary controller and at least one node device;

wherein the primary controller is configured to:

perform timing and execute a first task based on a frequency of a local clock signal of the primary controller; and send a reference clock signal to the at least one node device by using the ring network, wherein the reference clock signal is obtained by performing frequency division on the local clock signal of the primary controller; and wherein the at least one node device is configured to perform timing and execute a second task based on a frequency of the reference clock signal.

14. The vehicle according to claim 13, wherein the at least one node device comprises a phase-locked loop, and the at least one node device is configured to:

correct a frequency of a local clock signal of the node device, based on the frequency of the reference clock signal by using the phase-locked loop, to maintain a target ratio between the frequency of the local clock signal of the node device and the frequency of the reference clock signal; and perform timing based on the frequency of the local clock signal of the node device.

15. The vehicle according to claim 13, wherein the at least one node device is at least one secondary controller, the control system further comprises at least one sensor and at least one executor, the at least one sensor is connected to the primary controller or the at least one secondary controller, and the at least one executor is connected to the primary controller or the at least one secondary controller; and wherein a task that needs to be executed by the primary controller and a task that needs to be executed by the at least one secondary controller each comprise one or more of a data transmission task, a data processing task, a sending task of an instruction, and an output task of a drive signal, and wherein the instruction is used to instruct the at least one sensor to collect data or to output the drive signal to the at least one executor.

16. The vehicle according to claim 15, wherein the primary controller is further configured to:

determine the task that needs to be executed by the primary controller and an execution moment of the task that needs to be executed by the primary controller;

determine the task that needs to be executed by the at least one secondary controller and an execution moment of the task that needs to be executed by the at least one secondary controller;

execute a task at the execution moment of the task that needs to be executed by the primary controller; and send a task scheduling table to the at least one secondary controller, wherein the task scheduling table received by the at least one secondary controller comprises the task that needs to be executed by the at least one secondary controller and the execution moment of the task that needs to be executed by the at least one secondary controller; and wherein the at least one secondary controller is configured to execute, based on the task scheduling table, a task at the execution moment of the task that needs to be executed by the at least one secondary controller.

17. The vehicle according to claim 15, wherein the primary controller is further configured to:

divide a general data processing task into a plurality of data processing tasks; and determine, based on load of the primary controller and load of the at least one secondary controller, a data processing task that needs to be executed by the primary controller and a data processing task that needs to be executed by the at least one secondary controller.

18. The vehicle according to claim 15, wherein the at least one secondary controller further stores a priority list, the priority list comprises a priority of the at least one secondary controller, and the at least one secondary controller is further configured to:

if it is determined that the primary controller is faulty or any signal cable connected to the primary controller is faulty, determine a new primary controller from the at least one secondary controller based on the priority list.

19. The vehicle according to claim 15, wherein the primary controller and the at least one secondary controller are further configured to:

send target data to another controller in the control system by using the ring network; and if the target data transmitted by using the ring network is not received or received target data transmitted by using the ring network is inconsistent with the sent target data, perform at least one of fault detection on the ring network or resending the target data.

20. The vehicle according to claim 19, wherein the control system further comprises a gateway, the gateway is connected to the primary controller or the at least one node device, and the gateway is configured to:

send, to an external device, data from a device connected to the gateway; and send, to the device connected to the gateway, data from the external device, wherein the external device is a device independent of the control system.

* * * * *